US009181507B2

(12) United States Patent
Narine et al.

(10) Patent No.: US 9,181,507 B2

(45) Date of Patent: Nov. 10, 2015

(54) PHASE BEHAVIORS AND PROPERTIES OF CERTAIN TRIACYLGLYCEROLS AND FATTY ACID METHYL ESTERS

(71) Applicant: TRENT UNIVERSITY, Peterborough (CA)

(72) Inventors: Suresh Narine, Peterborough (CA); Laziz Bouzidi, Peterborough (CA); Bruce Darling, Peterborough (CA); Mark Baker, Peterborough (CA); Shaojun Li, Peterborough (CA); Ali Mahdevari, Peterborough (CA)

(73) Assignee: Trent University, Peterborough, Ontario (CA)

( * ) Notice: Subject to any disclaimer, the term of this patent is extended or adjusted under 35 U.S.C. 154(b) by 0 days.

(21) Appl. No.: 13/863,137

(22) Filed: Apr. 15, 2013

(65) Prior Publication Data

US 2013/0269241 A1 Oct. 17, 2013

Related U.S. Application Data

(60) Provisional application No. 61/624,364, filed on Apr. 15, 2012, provisional application No. 61/780,817, filed on Mar. 13, 2013.

(51) Int. Cl.

*C10L 1/19* (2006.01)

(52) U.S. Cl.

CPC . *C10L 1/19* (2013.01); *C10L 1/191* (2013.01); *C10L 2200/0476* (2013.01); *C10L 2230/14* (2013.01)

(58) Field of Classification Search

CPC ....... C10L 1/19; C10L 1/191; C10L 2230/14; C10L 2200/0476

USPC .......................................................... 44/308

See application file for complete search history.

(56) References Cited

U.S. PATENT DOCUMENTS

| | | | | |
|---|---|---|---|---|
| 3,337,596 | A * | 8/1967 | Thompson | 554/154 |
| 2006/0236598 | A1 | 10/2006 | Selvidge | |
| 2010/0083567 | A1 | 4/2010 | Körber et al. | |

FOREIGN PATENT DOCUMENTS

| | | |
|---|---|---|
| WO | WO 2012/021959 A1 | 2/2012 |

OTHER PUBLICATIONS

Sigma-Aldrich Internet Chemical Catalog, 1,3-dioleoyl-2-palmitoylglycerol, date unknown.*

International Search Report and Written Opinion of the International Searching Authority for International Application No. PCT/IB2013/001465, dated Dec. 2, 2013, 9 page.

* cited by examiner

*Primary Examiner* — Cephia D Toomer

(74) *Attorney, Agent, or Firm* — Nirav Patel

(57) ABSTRACT

This application relates to phase behaviors of certain triacylglycerols and fatty acid methyl esters, and how the phase behaviors of these individual components in a biodiesel fuel, as well as their combined mixtures, helps understand the fundamental mechanisms of their crystallization so as to design biodiesel fuels with improved low temperature characteristics.

16 Claims, 23 Drawing Sheets

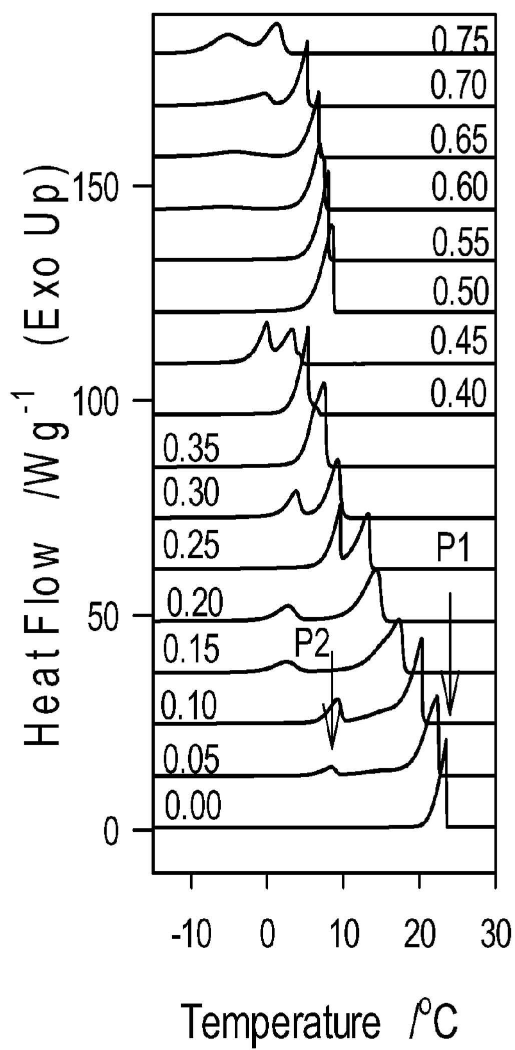
FIG. 1(a)(1)
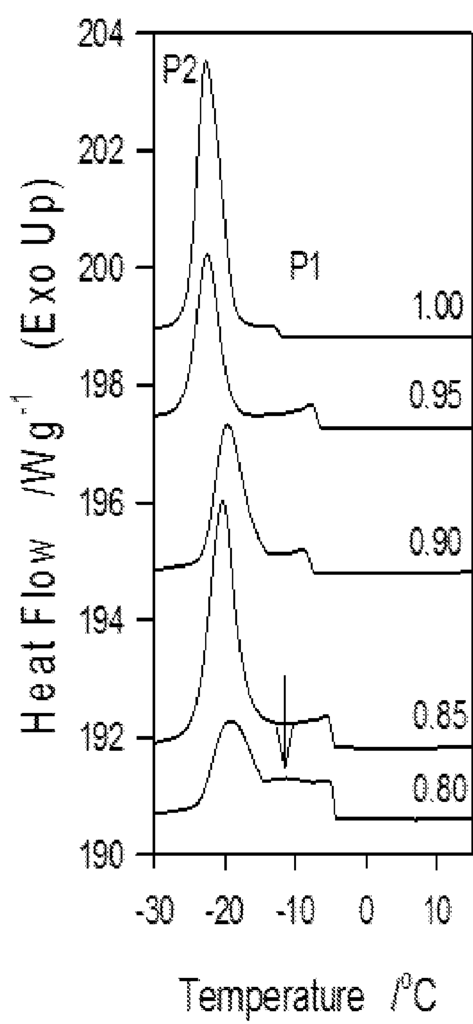
FIG. 1(a)(2)

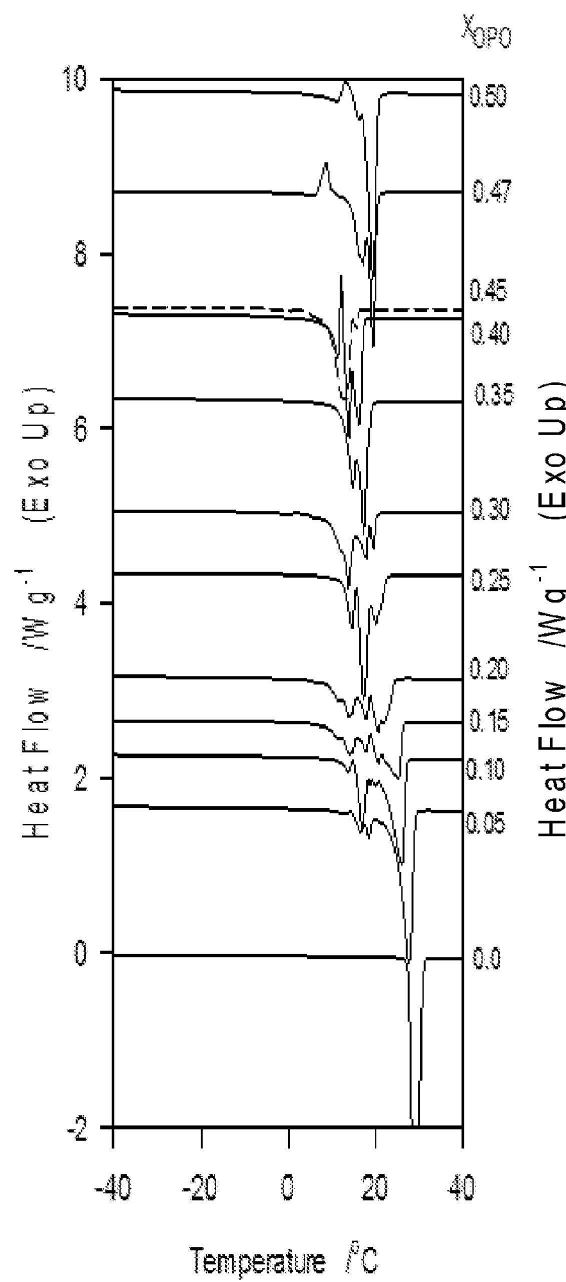
FIG. 2(a)(1)
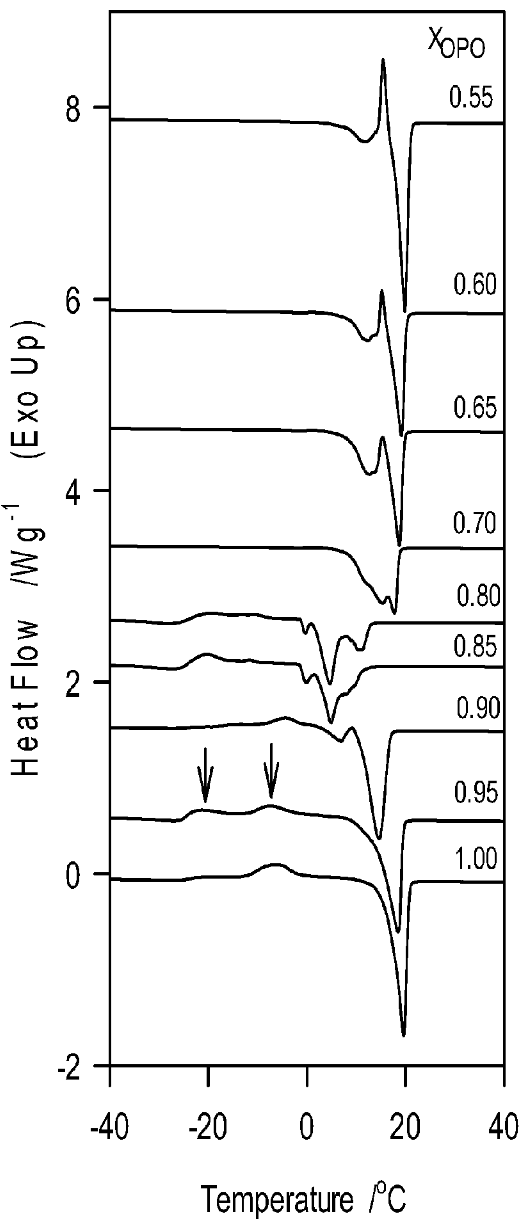
FIG. 2(a)(2)

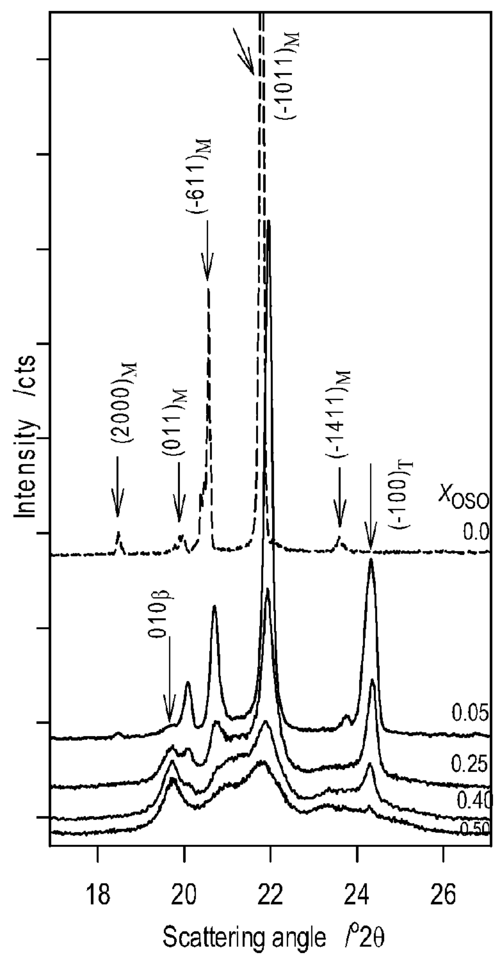
FIG. 4(a)(1)
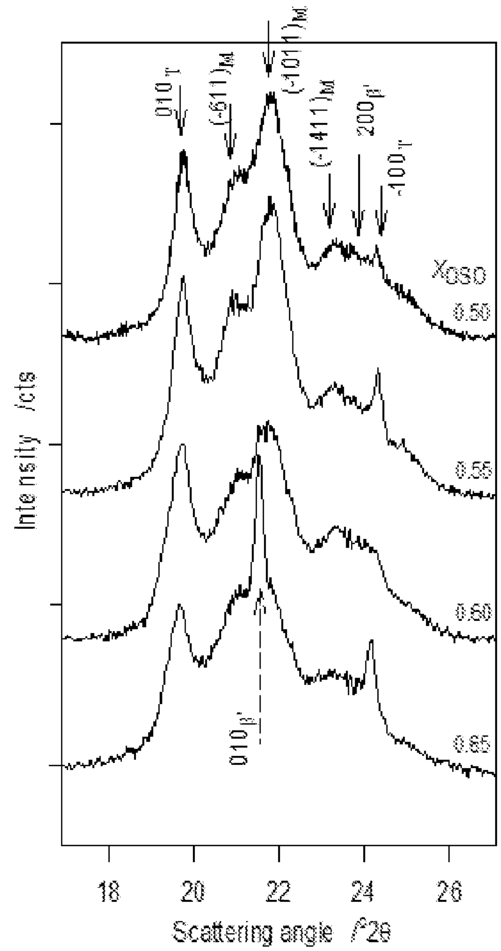
FIG. 4(a)(2)

FIG. 4(a)(3)

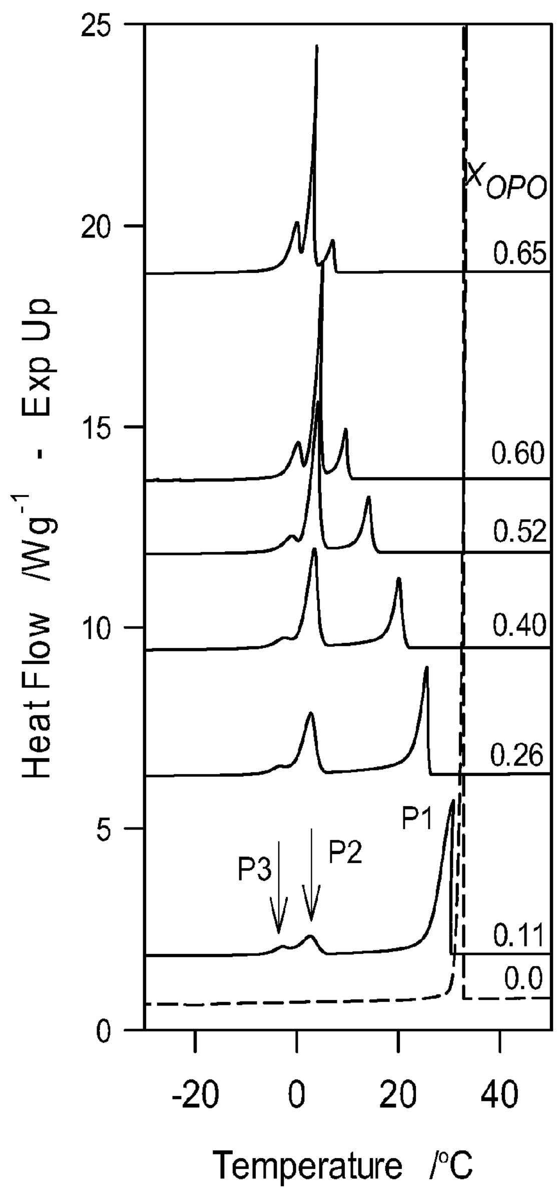
FIG. 9(a)(1)
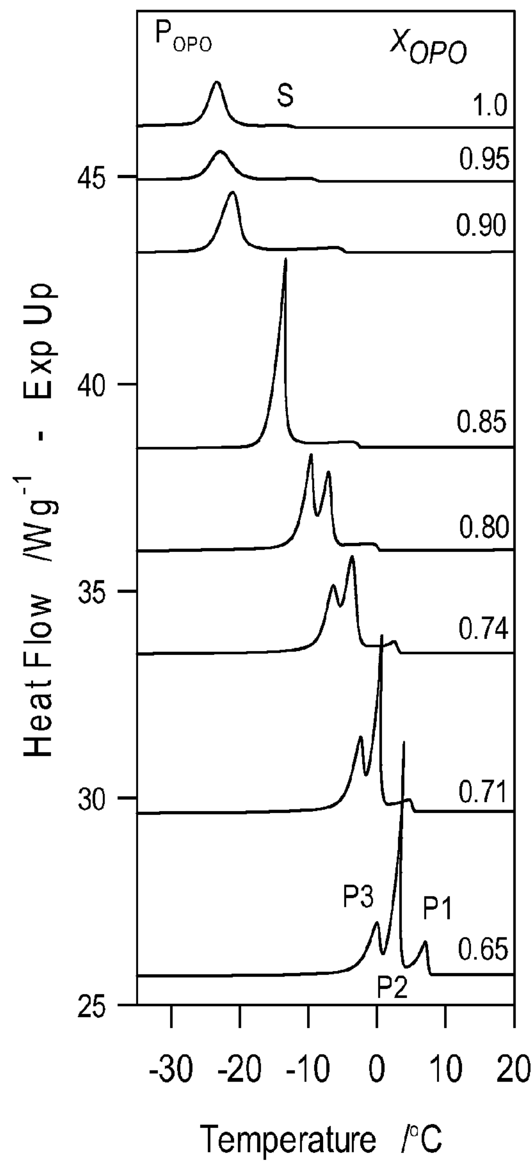
FIG. 9(a)(2)

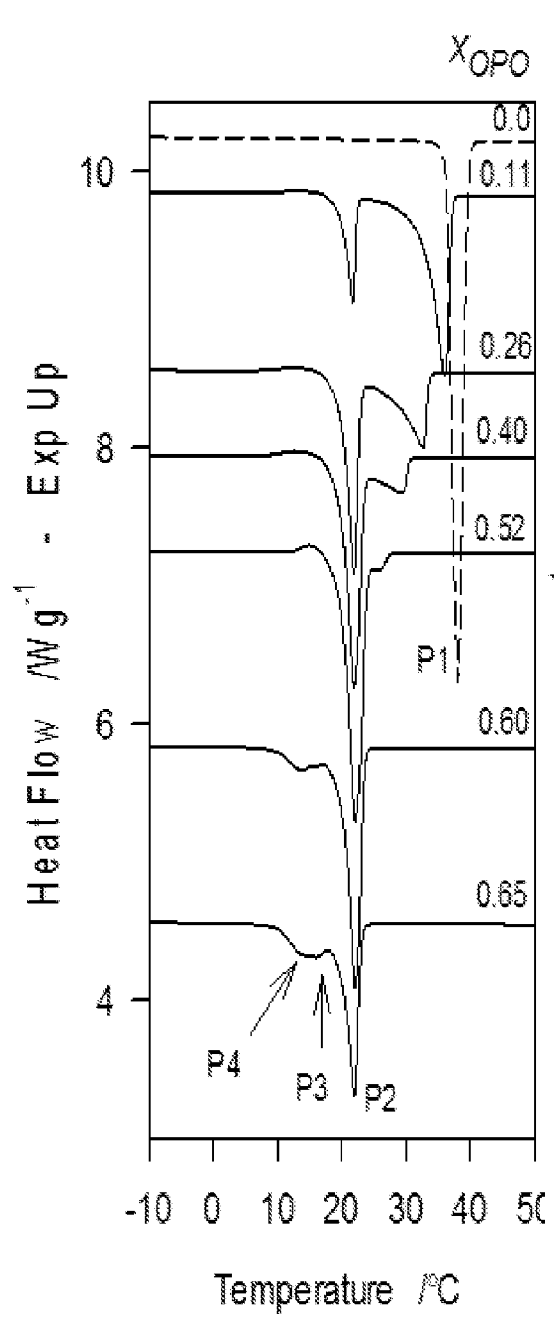
FIG. 10(a)(1)
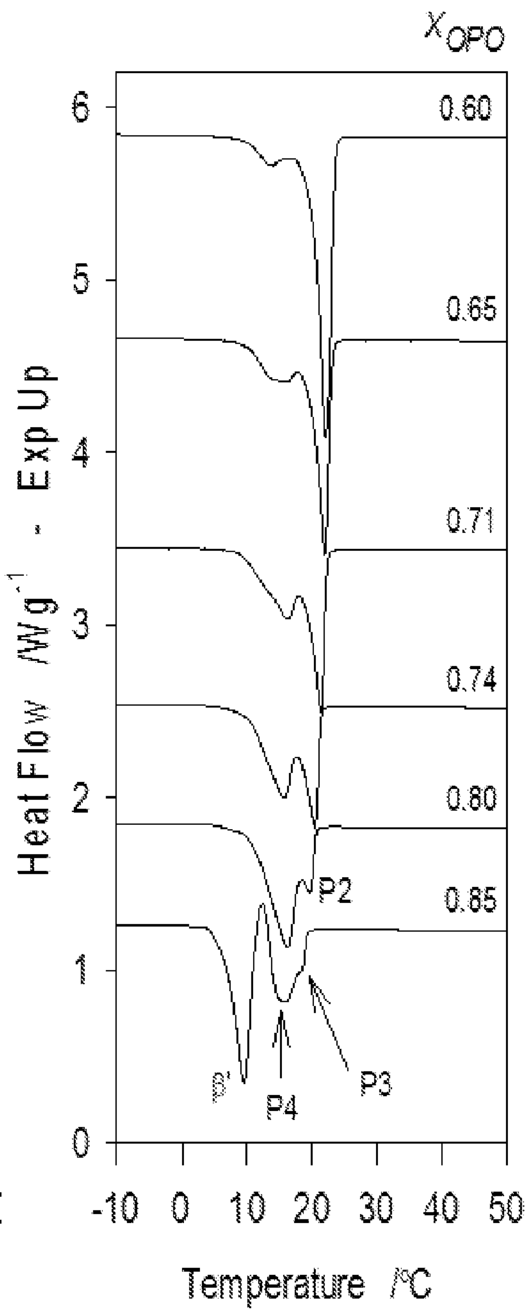
FIG. 10(a)(2)

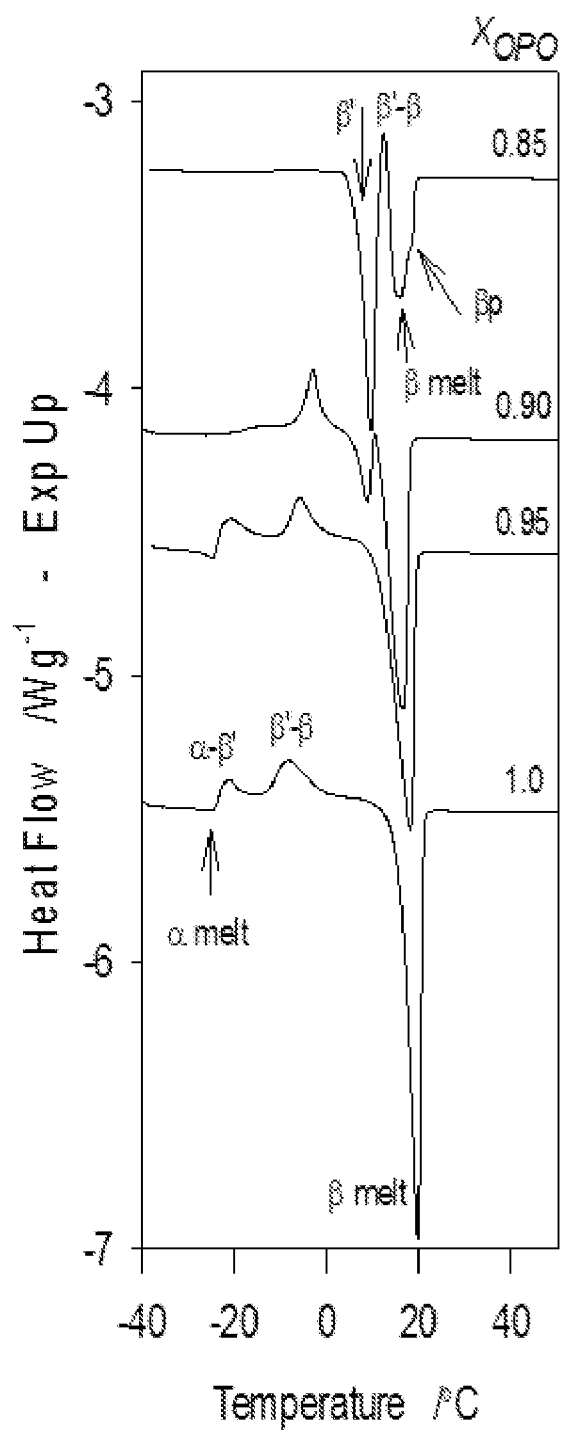
FIG. 10(a)(3)

PHASE BEHAVIORS AND PROPERTIES OF CERTAIN TRIACYLGLYCEROLS AND FATTY ACID METHYL ESTERS

CROSS REFERENCE TO RELATED APPLICATIONS

A claim of priority for this application under 35 U.S.C. §119(e) is hereby made to U.S. Provisional Patent Application No. 61/624,364, filed Apr. 15, 2012 and U.S. Provisional Patent Application No. 61/780,817, filed Mar. 13, 2013; the disclosures of which are incorporated herein by reference in their entireties.

BACKGROUND

Diesel fuels and/or biodiesel fuels typically contain wax and when subjected to low temperatures these fuels often undergo wax crystallization, gelling, and/or viscosity increase. This reduces the ability of the fuel to flow and creates filter plugging which adversely affects the operability of vehicles using these fuels. Flow improvers have been used to modify the wax structure as it builds during cooling. These additives are typically used to keep the wax crystals small so that they can pass through fuel filters. Also, pour point dispersants are sometimes used in diesel fuel to ensure that it can be pumped at low temperatures.

Due to environmental concerns and the decline of known petroleum reserves with subsequent price increase of petroleum, biodiesel fuels are becoming a focus of intense research and development efforts. Biodiesel fuels typically comprise fatty acid esters, prepared for example by transesterifying triglycerides with lower alcohols, e.g. methanol or ethanol. A typical biodiesel fuel is the fatty acid ester of a natural oil, with non-limiting examples of natural oils such as canola oil, rapeseed oil, coconut oil, corn oil, cottonseed oil, olive oil, palm oil, peanut oil, safflower seed oil, sesame seed oil, soybean oil, sunflower oil, linseed oil, palm kernel oil, tung oil, jojoba oil, jatropha oil, mustard oil, camellina oil, pennycress oil, hemp oil, algal oil, castor oil, lard, tallow, poultry fat, yellow grease, fish oil, tall oils, and mixtures thereof. Optionally, the natural oil may be partially and/or fully hydrogenated, and may also be refined, bleached, and/or deodorized. One of the major problems associated with the use of biodiesel is its poor cold flow properties resulting from crystallization of saturated fatty compounds in cold conditions, as indicated by its relatively high cloud points (CP) and pour points (PP). A 20° C. reduction in cold filter plugging point is necessary for some biodiesel fuels to find utility in colder climates such as those of North America and Europe in winter.

Several efforts to mitigate the low-temperature problems of biodiesel have been investigated over the past several years. Many popular approaches have included blending biodiesel with conventional diesel fuel, winterization, and use of synthetic additives. Also, studies have been performed to show the diversification in the feedstock and genetic modification of the feedstocks aimed to provide a reduction in the saturated content of the fatty acid methyl esters (FAME) in biodiesel as well as modification of FAME composition/profile of the fuels. While there have been efforts to create additives that may reduce the PP and cold filter plugging point (CFPP) of fuels, many are not cost effective. Also, increasing the unsaturated content of biodiesel may improve its cold flow properties, but leads to the alteration of the oxidative stability of the fuel. The overall thermal behavior of biodiesel is affected by the relative concentration of its saturated and unsaturated FAME components. The cold flow issue is primarily a multifaceted problem of crystallization (of saturated FAMEs) in solution (unsaturated FAMEs) which can be approached from several angles. Studies of the phase behavior of the individual FAMEs and mixtures constituting the biodiesel have already been used as a means to better understand the thermodynamics and kinetics of phase change in biodiesel. Phase diagrams of FAME systems are particularly investigated and modeled to provide an understanding of the molecular interactions involved, intersolubility and detection of special transformation points such as eutectics, peritectics and compound formation.

We have found that studying the phase behavior of the individual components of biodiesel, as well as their combined mixtures, helps understand the fundamental mechanisms of their crystallization so as to design biodiesel with improved low temperature characteristics. Fundamentally, the objective would be to adequately disrupt the crystallization process at both the nucleation and growth stages in order to lower the onset temperature of crystallization and decrease the number and size of the crystals. In this regard, a better understanding of the phase behavior of the biodiesel components and any potential additive which is an "improver" of cold flow or any other property is of key importance.

The development of specific thermodynamic models for predicting crystallization/melting behavior of biodiesel and biodiesel/additive would be a valuable tool in industry and commercial applications. In particular, we have studied binary phase behaviors of certain triacylglycerols (TAGs) such as 1,3-dioleoyl-2-palmitoyl glycerol (OPO) and 2-stearoyl diolein (OSO), and fatty acid methyl esters (FAMEs) such as methyl palmitate (MeP) and methyl stearate (MeS), and/or mixtures thereof.

BRIEF SUMMARY

Compositions are disclosed for biodiesel crystallization depressants. In certain embodiments, the composition comprises a triacylglycerol comprising 1,3-dioleoyl-2-palmitoyl glycerol.

FIG. **1*b*** depicts characteristic cooling temperatures of the MeP/OPO mixtures. Symbols represent: □: onset temperature of crystallization, $T_{on}$; ●: peak temperature of the leading exotherm, $T_{P1}$; ○: peak temperatures of the following exotherms forming successive phase transformation lines; ☆: eutectic line 1; ★: eutectic line 2.

FIG. **2*a*1 and FIG. 2*a*2** depict DSC heating thermograms (2° C./min) of MeP/OPO mixtures previously cooled at 5° C./min.

FIG. **2*b*** depicts kinetic phase diagram of the MeP/OPO binary system using the melting characteristics of the mixtures. Symbols represent: $T_{off}$, □; possible metatectic temperature, ζ; eutectic temperature, ●; phase transition temperature, ♦. Numbered arrows point to the eutectic compositions and letter arrow points to the 1:1 compound.

Figure 3:
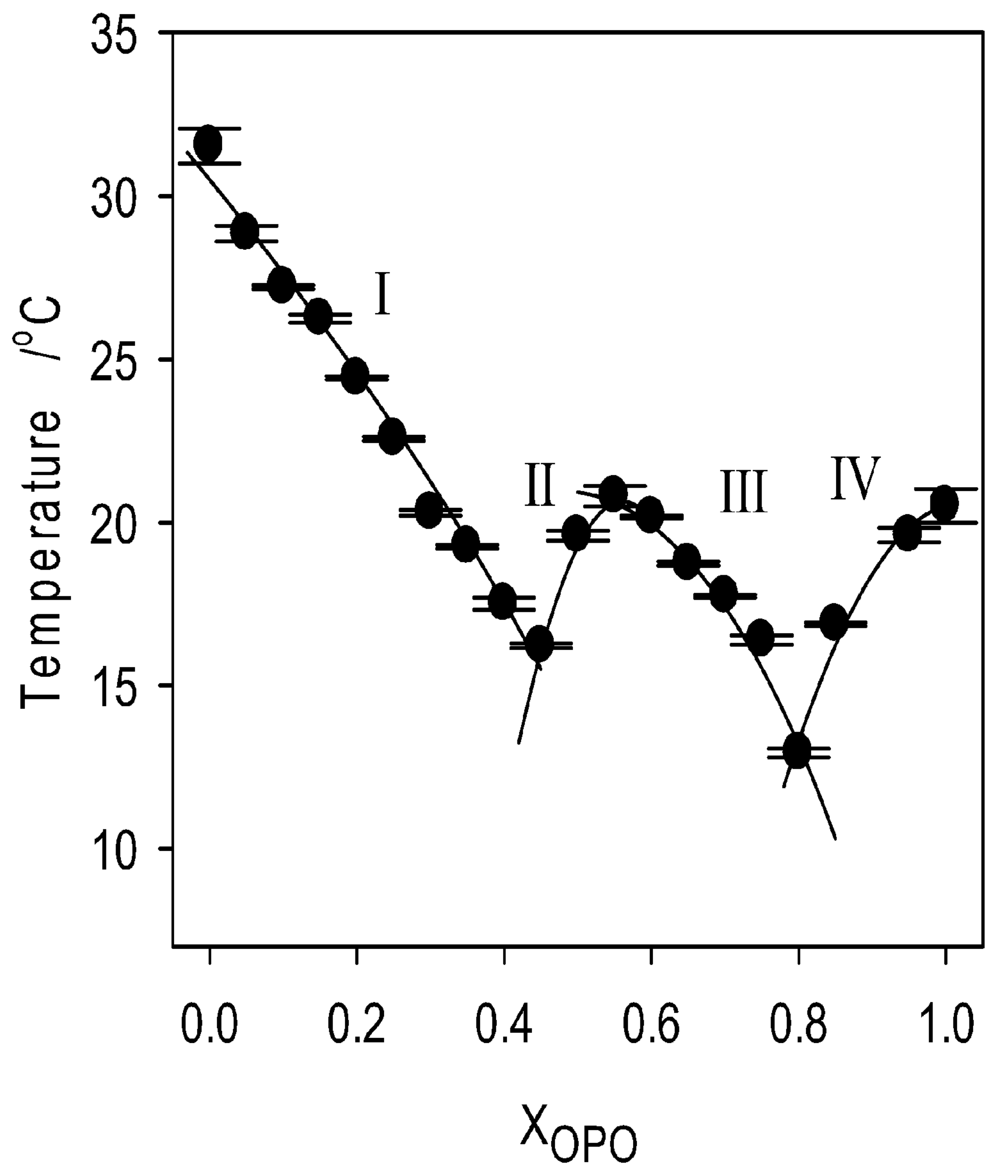

FIG. 3 depicts experimental (●) and calculated (solid line) liquidus line of the MeP/OPO binary system.

FIG. **4*a*1, FIG. 4*a*2, and FIG. 4*a*3** depict wide angle regions of selected XRD patterns of the different OSO/MeS mixtures obtained at −20° C.

Figure 4B:
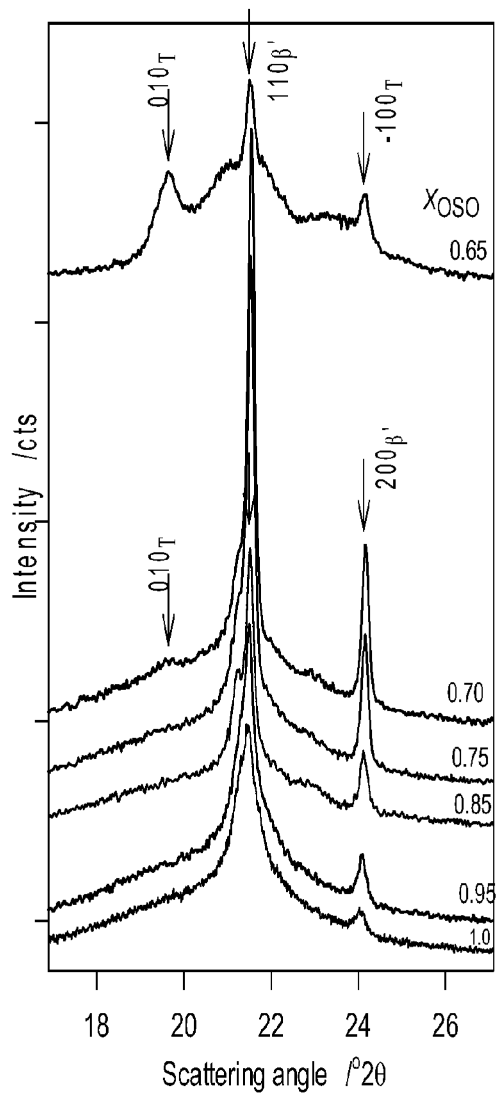
Figure 4B:
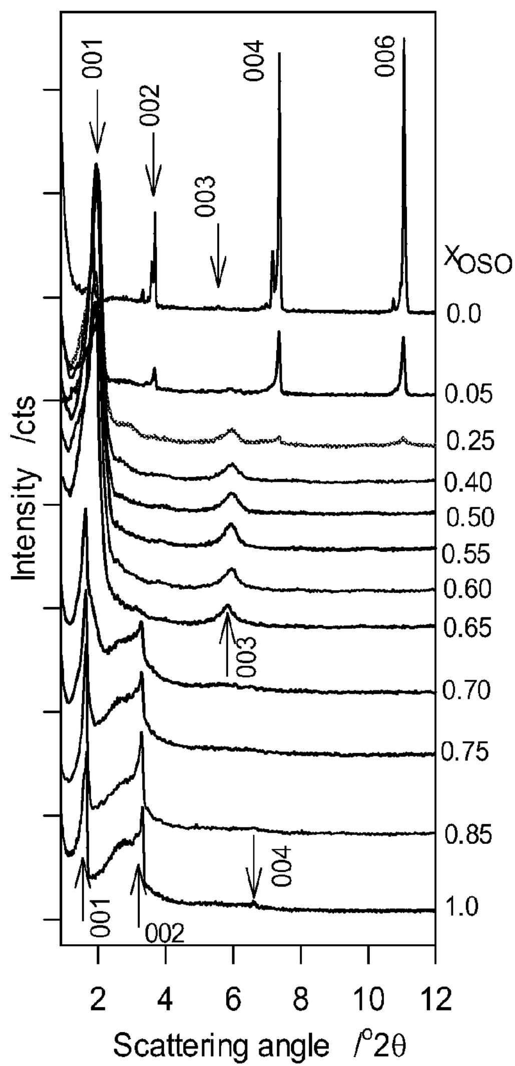

FIG. 4*b* depicts small angle regions of selected XRD patterns of the different OSO/MeS mixtures obtained at −20° C.

Figure 5:
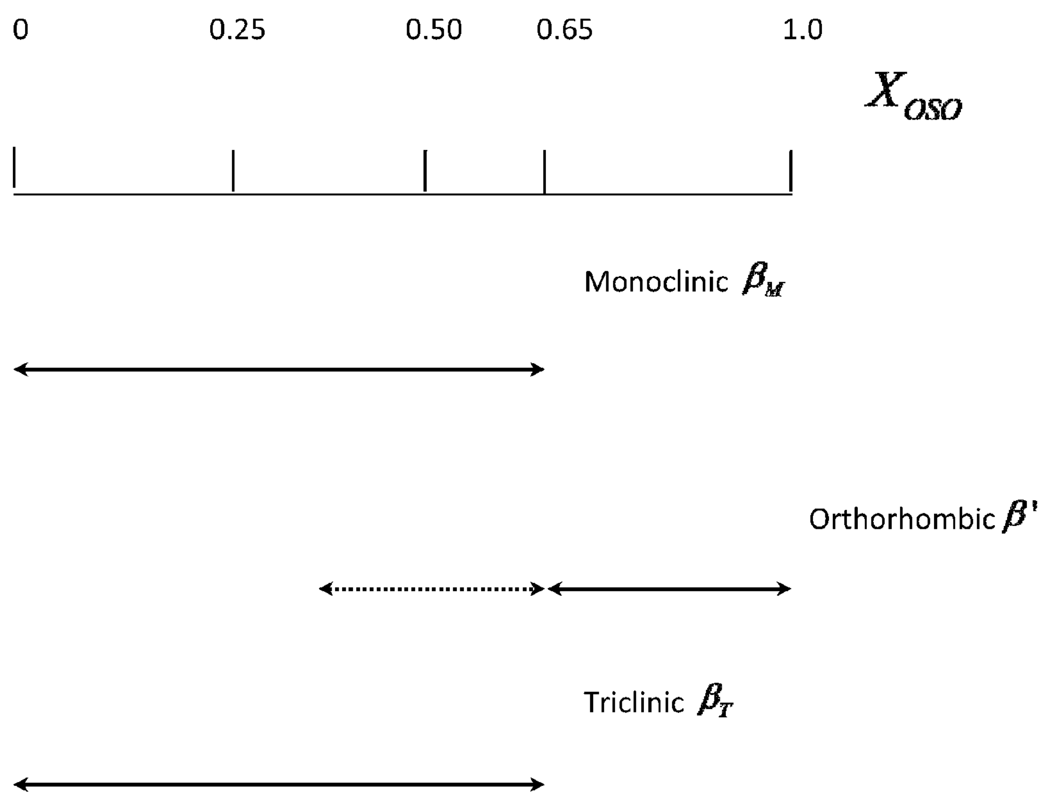

FIG. 5 depicts delimitation of the concentration regions of crystal phase coexistence.

Figure 6A:
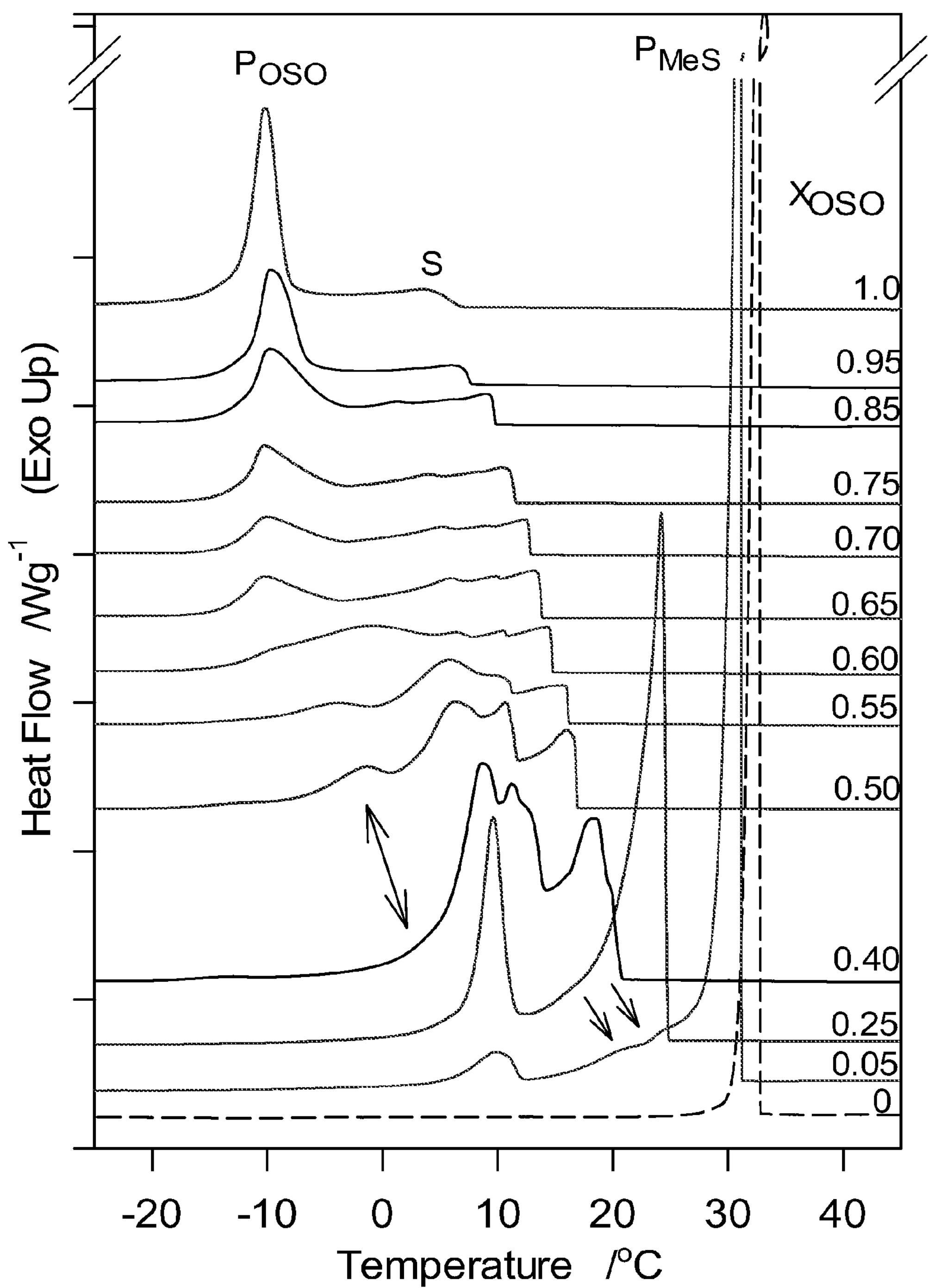

FIG. 6*a* depicts the DSC cooling thermograms of OSO/MeS mixtures cooled at 5 K/min.

Figure 6B:
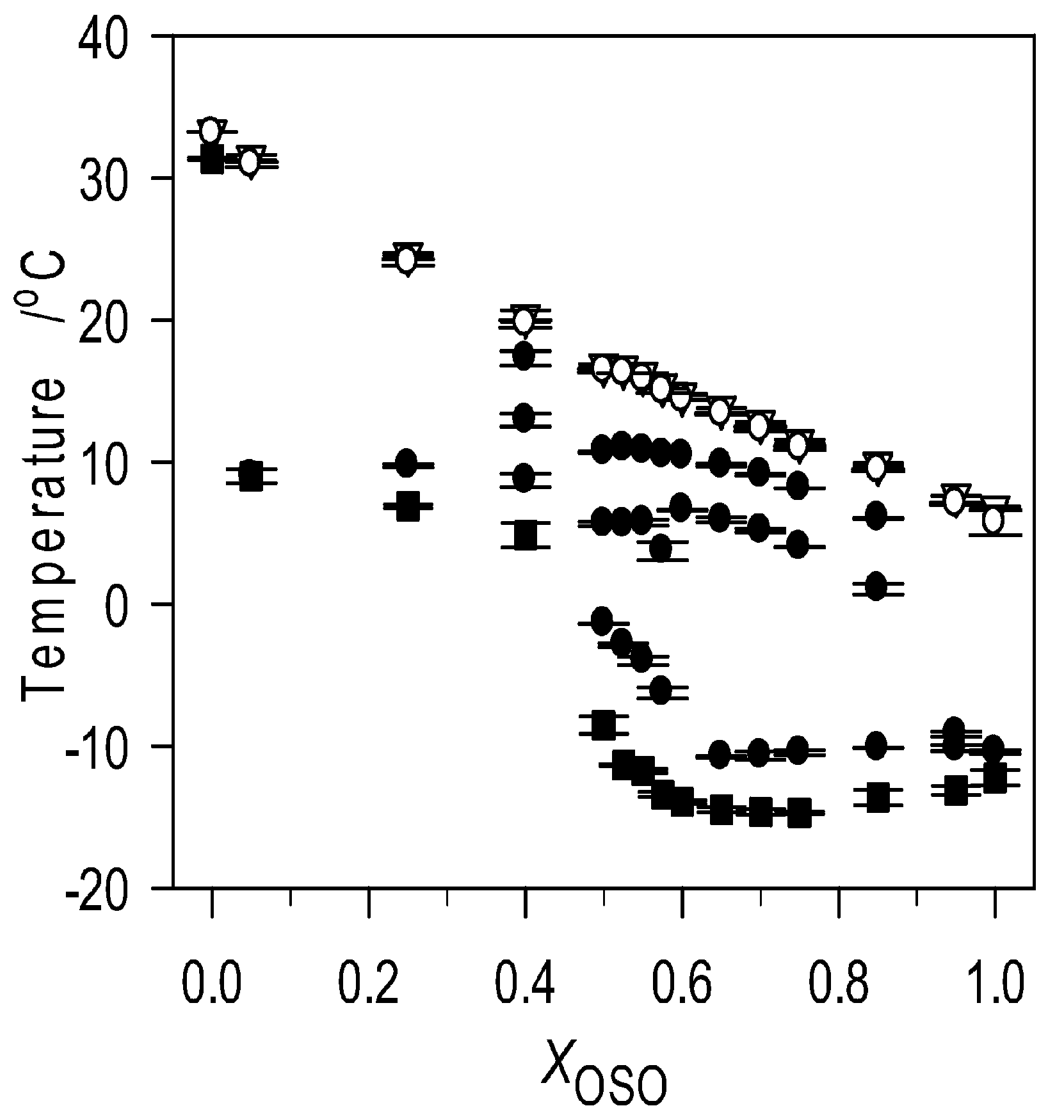

FIG. 6*b* depicts characteristic cooling temperatures of the MeS/OSO mixtures. Symbols represent: ∇: onset temperature of crystallization, $T_{on}$; ■: offset temperature of crystallization, $T_{off}$; ○: peak temperature of the leading exotherm, $T_{P1}$; ●: peak temperatures of the following exotherms forming successive phase transformation lines.

Figure 6C:
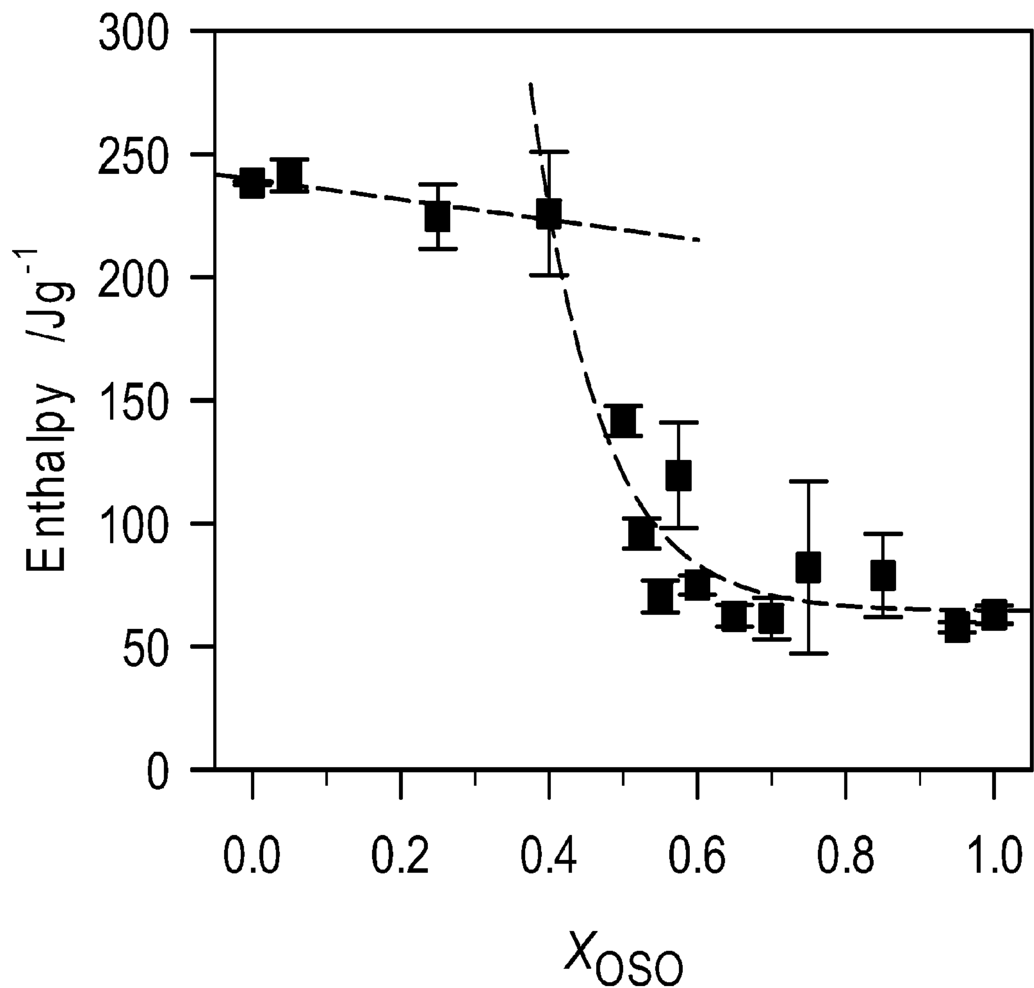

FIG. 6*c* depicts total enthalpy of crystallization of the OSO/MeS mixtures.

Figure 7A:
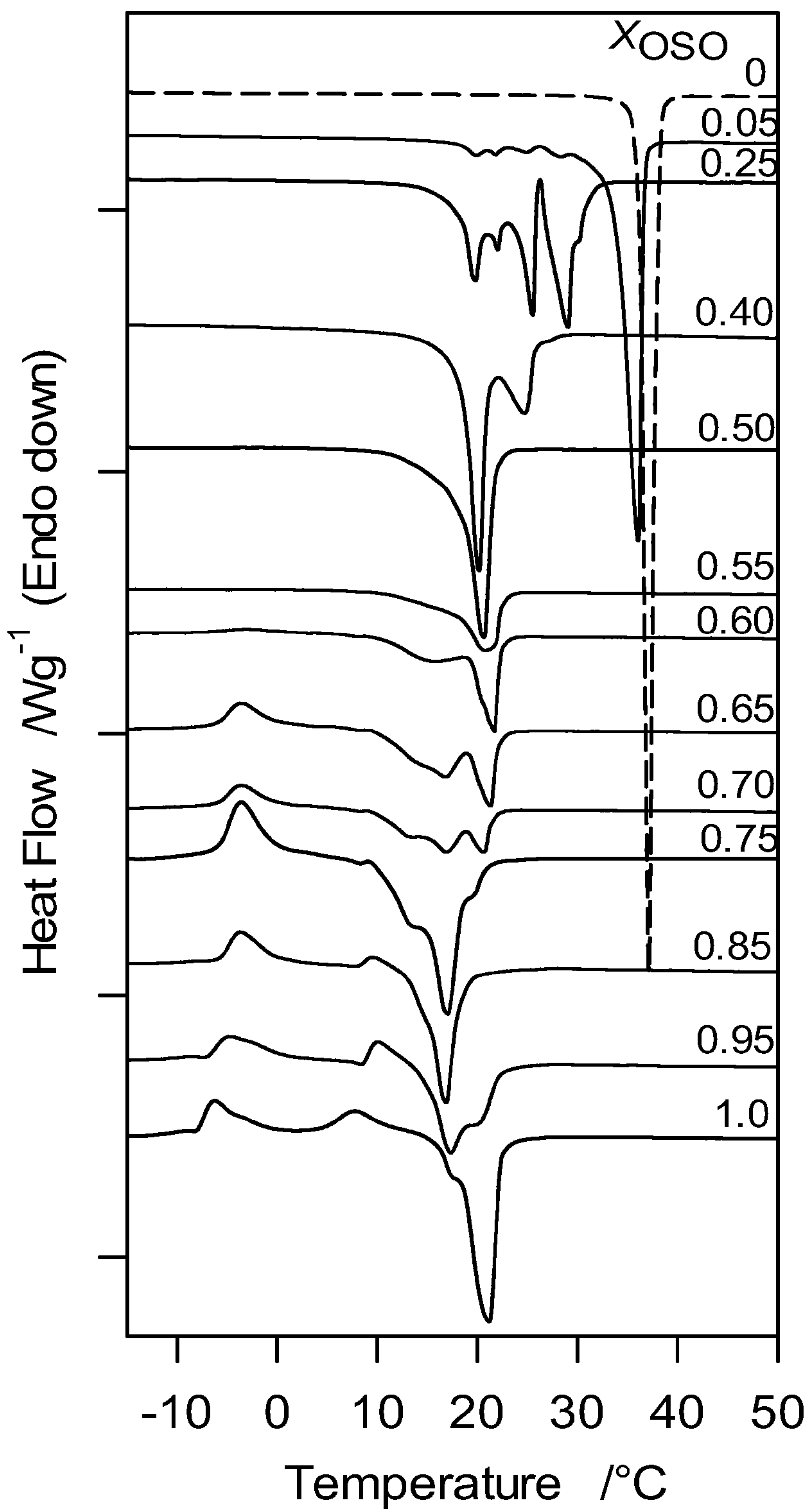

FIG. 7*a* depicts DSC heating thermograms of OSO/MeS mixtures.

Figure 7B:
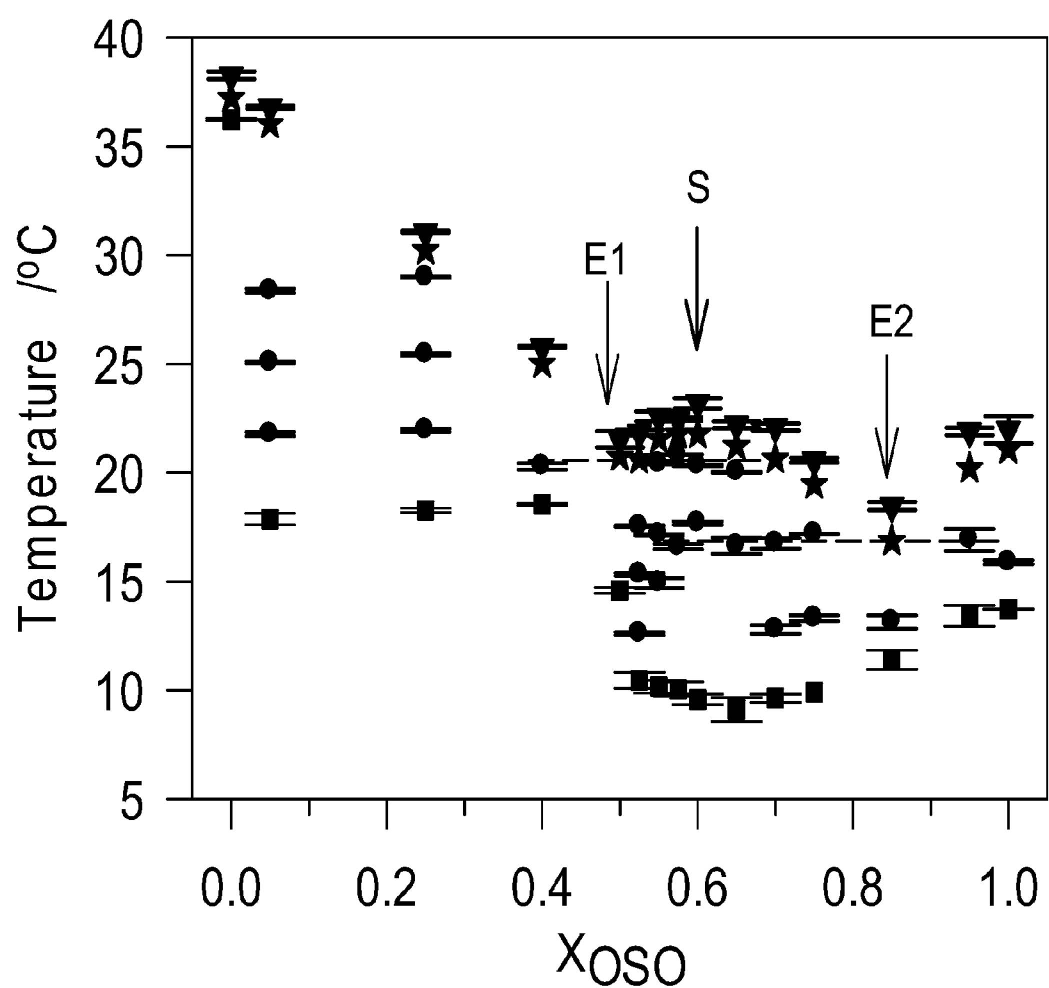

FIG. 7*b* depicts corresponding characteristic melting temperatures S: singularity, E1, E2: Eutectic 1 and 2, respectively versus OSO molar ratios. Symbols represent: ▼: offset temperature of melting, $T_{off}$; ⊈: last melting peak temperature; ■: onset temperature of melting; ●: peak temperatures of the following endotherms forming successive phase transformation lines.

Figure 7C:
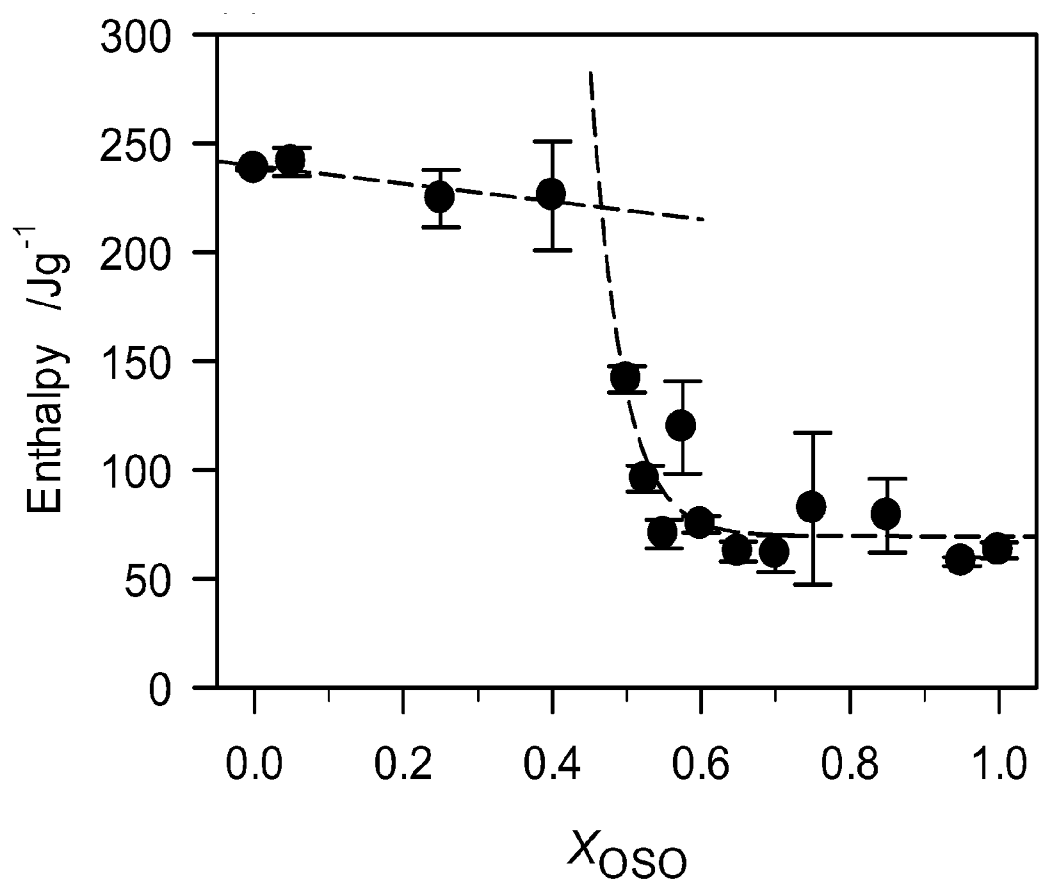

FIG. 7*c* depicts total enthalpy of melting of OSO/MeS mixtures.

Figure 8:
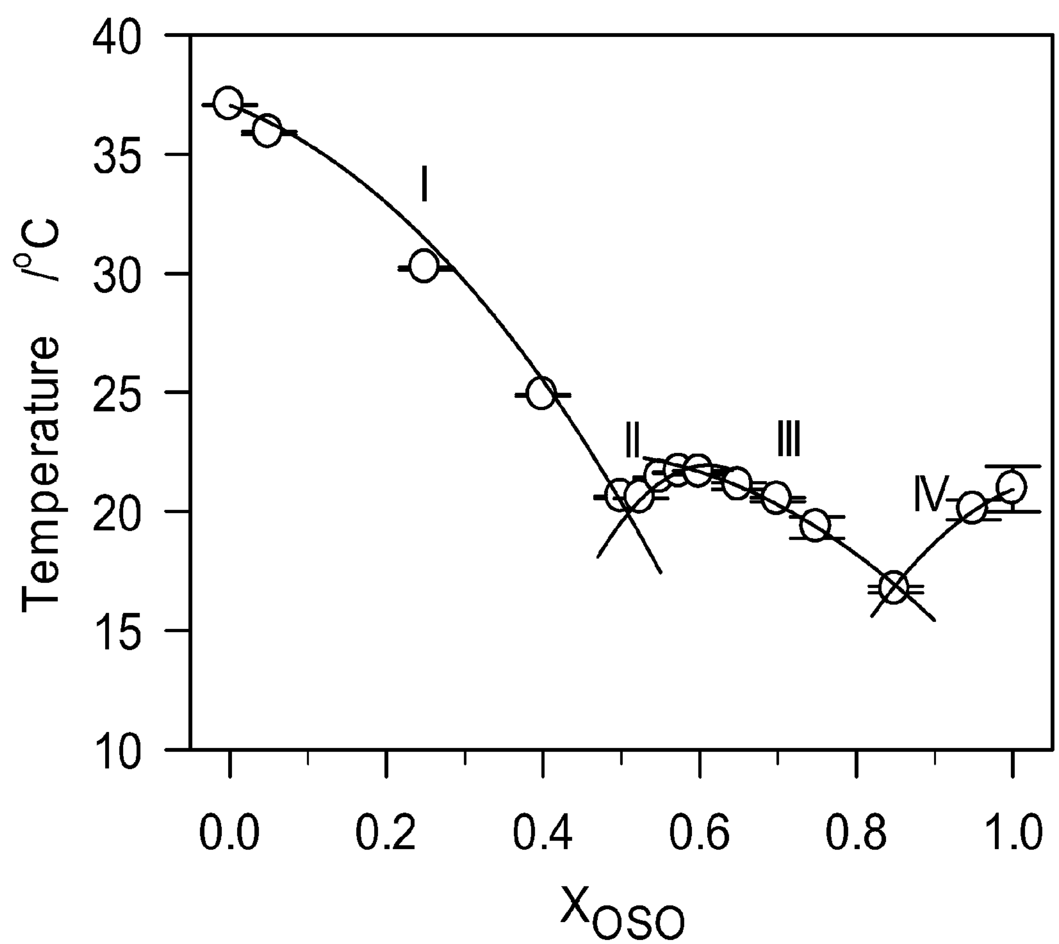

FIG. 8 depicts the Liquidus line in the phase diagram of the OSO/MeS binary system.

Figure 9B:
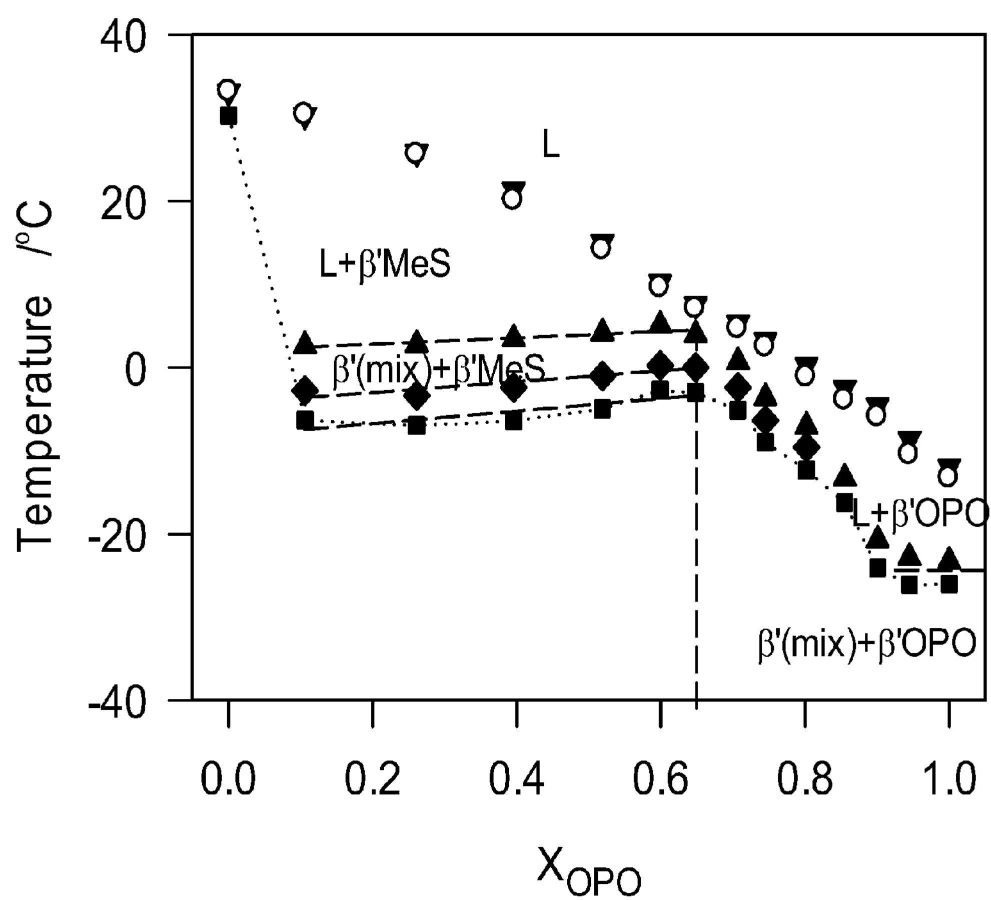

FIG. 9*a*1 and FIG. 9*a*2 depict DSC cooling thermograms of MeS/OPO mixtures cooled at 5° C./min. The numbers on the right above each thermogram line indicates the molar fraction of OPO. FIG. 9*b* depicts characteristic crystallization temperatures of the MeS/OPO mixtures obtained from the DSC cooling thermographs of FIGS. 9*a*1 and 9*a*2.

Figure 9C:
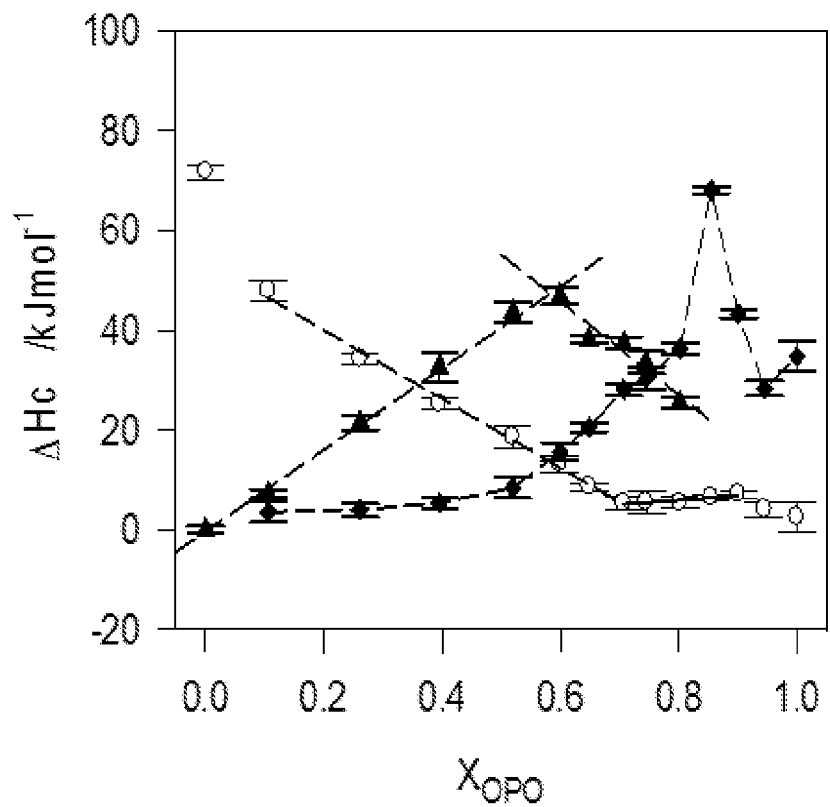

FIG. 9*c* depicts enthalpy peaks associated with the three transitions (○, P1, ▲, P2 and ♦, P3) plotted as function of the composition of the mixtures.

Figure 9D:
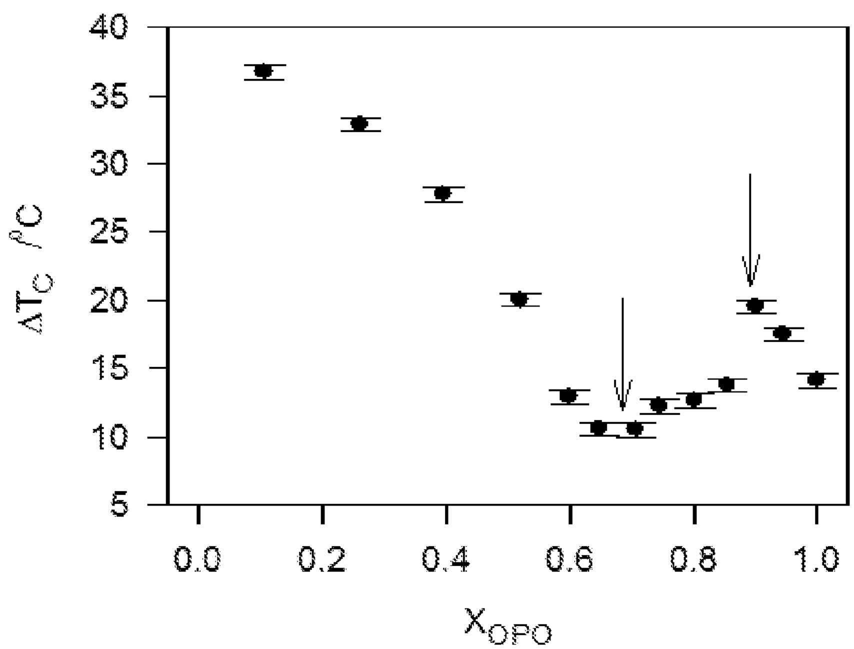

FIG. 9*d* depicts span of crystallization ($\Delta T_c$) versus OPO molar ratio.

FIG. 10*a*1, FIG. 10*a*2, and FIG. 10*a*3 depict DSC heating traces (2° C./min) obtained subsequent to cooling the mixtures from the melt at a rate of 5° C./min.

Figure 10B:
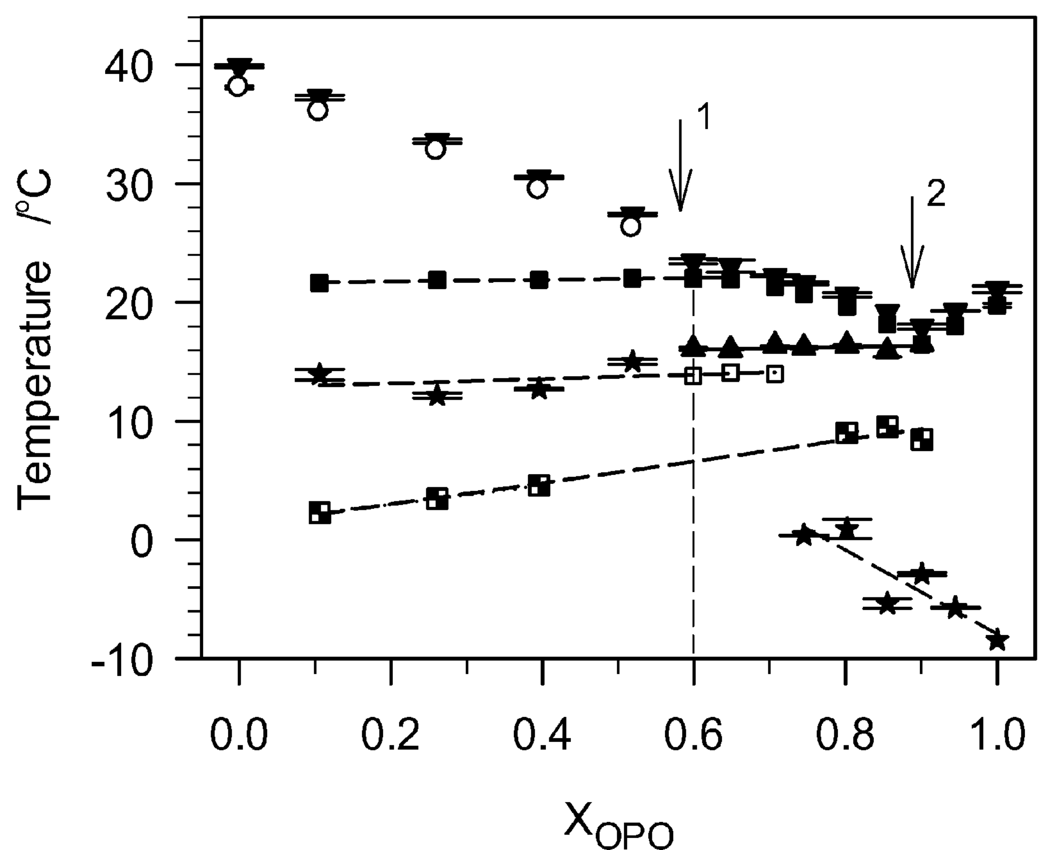

FIG. 10*b* depicts characteristic temperatures of the MeS/OPO mixtures obtained from the DSC heating thermograms of FIGS. 10*a*1, 10*a*2 and 10*a*3. Symbols represent: ▼: $T_{off}$; ★, recrystallization temperature; ■: peritectic temperature, ▲: eutectic temperature. Numbered arrows 1 and 2 point to the peritectic and eutectic compositions. Vertical dashed line: incongruent 1:1 compound.

Figure 10C:
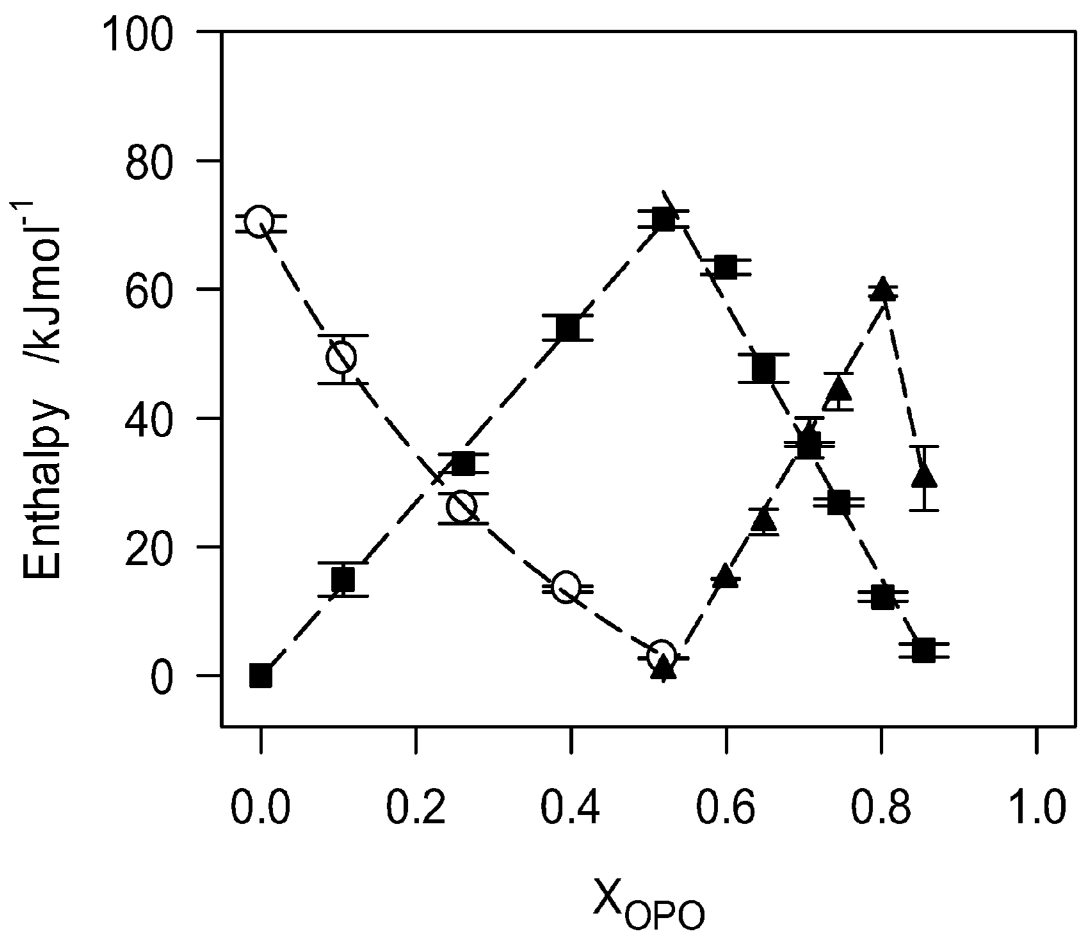

FIG. 10*c* depicts melting enthalpy of the peaks associated with the three transitions P1, P2, P3, and P4 (○, P1, ■, P2 and ▲, P3-4) plotted as function of the composition of the MeS/OPO mixtures.

Figure 11:
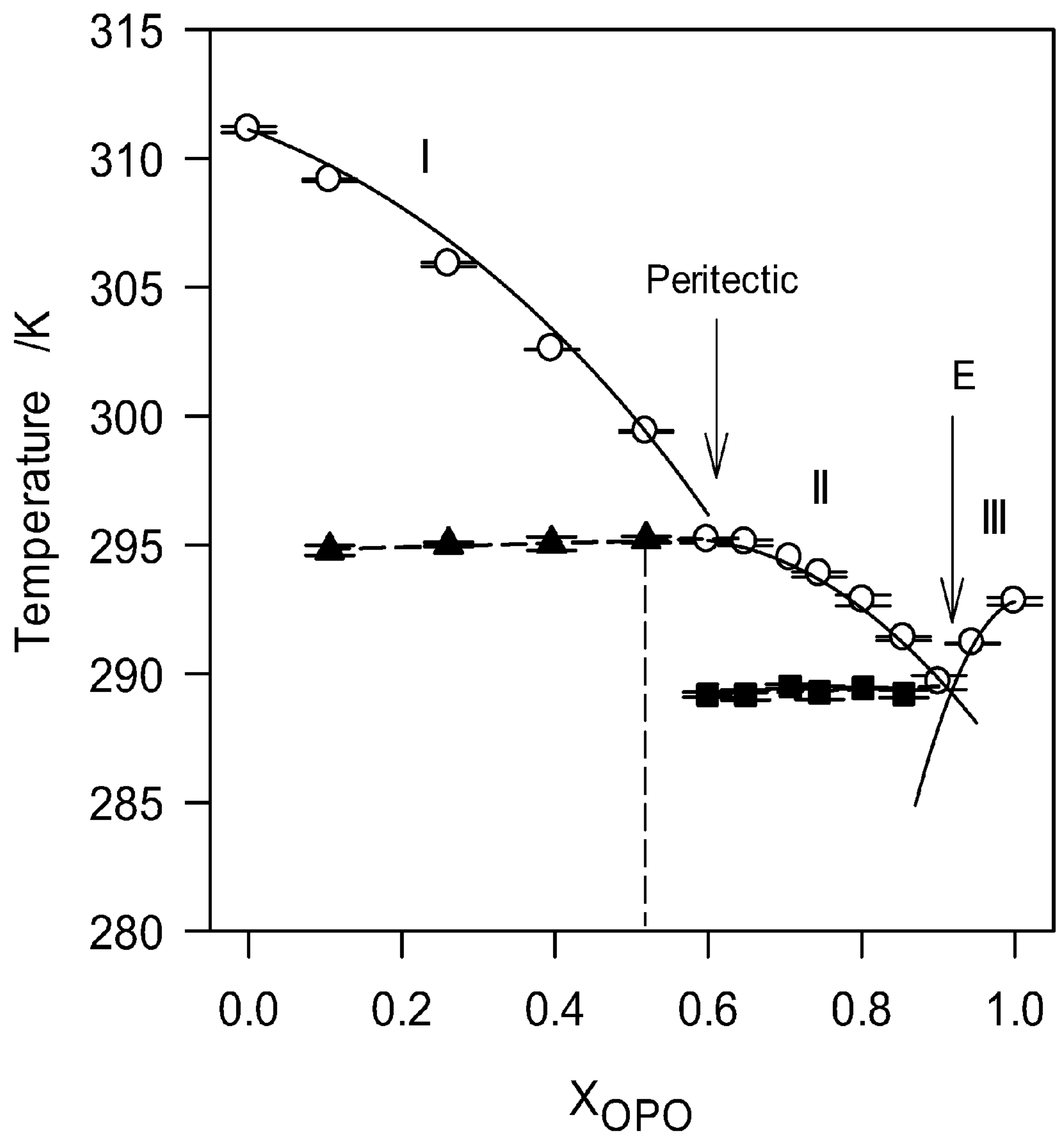

FIG. 11 depicts the experimental (○) and calculated (solid line) liquidus line of the MeS/OPO binary system. ▲, peritectic line; ■, eutectic line. Vertical dashed line: possible incongruent transformation.

DETAILED DESCRIPTION

Crystallization of FAMEs and Studies of OPO and/or MeP

As is well known, biodiesel comprises one or more monounsaturated, polyunsaturated, or saturated fatty acid methyl esters (FAMEs). In some embodiments, such fatty acid methyl esters may include methyl palmitate (MeP), methyl linoleate (MeL), methyl linolenate, methyl oleate (MeO), methyl stearate (MeS), methyl arachidate, methyl laurate, methyl myristate, methyl caprate, or methyl behenate. The FAMEs that make up the majority of most biodiesels are unsaturated methyl oleate (MeO), and methyl linoleate (MeL). The saturated FAME's, methyl stearate (MeS) and methyl palmitate (MeP), due to their high melting points, are the FAMEs that have the greatest influence on cold flow properties of biodiesel (the structures of MeO, MeL, MeS, and MeP, are shown below). They are also the primary factors for its crystallization at higher temperatures than desired.

The higher melting points of MeP and MeS, as compared to MeO and MeL, can be explained by an understanding of the crystallization process and how molecular structure can influence this process. Crystallization is a phase transition in which matter changes from a liquid to a solid, organized in a well-defined crystal lattice. Crystallization consists of two main processes, nucleation and growth (although these are not necessarily sequential beyond initial nucleation). Primary nucleation is the initial local clustering of molecules with low enough energy to form nuclei. That is, the internal molecular energy is low enough that inter-molecular attractive forces allow the molecules to assume regular lattice positions with respect to each other. Once a stable nucleus is formed, it grows provided that enough of the molecules in the melt have the correct molecular orientation and sufficient mobility in order to participate in the growth at the surface of the nucleus, and provided the subsequent heat of crystallization is conducted away from the growing surface.

Crystallization can further be explained by considering the Fisher-Turnbull equation:

$$J = \frac{Nk_B}{h} T \exp\left(-\frac{\Delta G_c}{k_B T}\right) \exp\left(-\frac{\Delta G_d}{k_B T}\right) \quad [1]$$

where J is the rate of formation of solid nuclei per unit volume per unit time, N is Avogadro's number, h is Planck's constant, $k_B$ is the Boltzmann constant, T is the isothermal crystallization temperature, $\Delta G_c$ is the activation free energy required to develop a stable nuclei and $\Delta G_d$ is the activation free energy for a molecule with the correct configuration to participate in the growth of the nuclei.

MeP and MeS, being linear molecules, can easily align with the surface of the crystal nucleus and therefore have a lower $\Delta G_d$. The unsaturated FAMEs have higher $\Delta G_d$ values compared to the saturated FAMEs because the unsaturated FAMEs are non-linear due to the presence of the cis double bonds in the carbon chains. One of the potential outcomes of a larger $\Delta G_d$, at identical isothermal crystallization temperatures and similar activation free energy needed to develop a stable nuclei, is a reduction in the nucleation rate. This suggests that the removal of saturated FAMEs like MeP and MeS would result in lowering of the temperature at which nucleation begins. However, removal of saturated FAMEs from biodiesel is not trivial and is an expensive process. Additionally, MeP and MeS are the most oxidatively stable FAMEs and have high cetane numbers, making them critical biodiesel components for meeting current fuel standards. There is therefore a need for a better understanding of the phase behavior of the individual components of biodiesel as well as their combined mixtures with TAG molecules in order to understand the fundamental mechanisms of their crystallization so as to design biodiesel with improved low temperature characteristics. In some embodiments, we have found that mixtures of certain fatty acid methyl esters, such as saturated fatty acid methyl esters, and TAG molecules exhibit a binary phase behavior comprising one or more eutectics.

We have studied that TAG molecules can disrupt the linear packing of fatty acid methyl esters, delay crystal nucleation, and mitigate crystal growth, when mixed with at least one monounsaturated, polyunsaturated, or saturated fatty acid methyl ester(s) of a biodiesel. In a typical triacylglycerol, each of the carbons in the triacylglycerol molecule is numbered using the stereospecific numbering (sn) system. Thus one fatty acyl chain group is attached to the first carbon (the sn-1 position), another fatty acyl chain is attached to the second, or middle carbon (the sn-2 position), and the final fatty acyl chain is attached to the third carbon (the sn-3 position). As used herein, the term "triacylglycerol" shall also include triacylglycerol oligomers therefrom, including triacylglycerol dimers, triacylglycerol trimers, triacylglycerol tetramers, triacylglycerol pentamers, and higher order triacylglycerol oligomers (e.g., triacylglycerol hexamers, triacylglycerol heptamers, triacylglycerol octamers, triacylglycerol nonamers, triacylglycerol decamers, and higher than triacylglycerol decamers).

In some embodiments, we have found that triacylglycerols and oligomers therefrom with two unsaturated fatty acids in the cis-configuration and a saturated fatty acid or an unsaturated fatty acid in the trans-configuration are highly functional in depressing the onset of crystallization of biodiesel. In many triacylglycerols, the presence of double bonds in fatty acids prevents the free rotation in molecule and creates two configurations, cis- and trans-, which are also called configurational isomers. In cis-form, the hydrogen atoms of double bonded carbon atom oriented on same side, whereas in trans form, they are oriented in opposite directions. Cis-fatty acids are generally found naturally while trans-fatty acids are typically manufactured fats which are created via hydrogenation of mono- or polyunsaturated fatty acids. Trans fatty acids are isomers of monounsaturated and polyunsaturated fatty acids having non-conjugated, interrupted by at least one methylene group, carbon-carbon double bonds in the trans configuration.

Suitable fatty acids may be saturated or unsaturated (monounsaturated or polyunsaturated) fatty acids, and may have carbon chain lengths of 3 to 36 carbon atoms. Such saturated or unsaturated fatty acids may be aliphatic, aromatic, saturated, unsaturated, straight chain or branched, substituted or unsubstituted, fatty acids, and mono-, di-, tri-, and/or polyacid variants, hydroxy-substituted variants, aliphatic, cyclic, alicyclic, aromatic, branched, aliphatic- and alicyclic-substituted aromatic, aromatic-substituted aliphatic and alicyclic groups, and heteroatom substituted variants thereof. Any unsaturation may be present at any suitable isomer position along the carbon chain to a person skilled in the art.

Some non-limiting examples of saturated fatty acids include propionic, butyric, valeric, caproic, enanthic, caprylic, pelargonic, capric, undecylic, lauric, tridecylic, myristic, pentadecanoic, palmitic, margaric, stearic, nonadecyclic, arachidic, heneicosylic, behenic, tricosylic, lignoceric, pentacoyslic, cerotic, heptacosylic, carboceric, montanic, nonacosylic, melissic, lacceroic, psyllic, geddic, ceroplastic acids.

Some non-limiting examples of unsaturated fatty acids include butenoic, pentenoic, hexenoic, pentenoic, octenoic, nonenoic acid, decenoic acid, undecenoic acid, dodecenoic acid, tridecenoic, tetradecenoic, pentadecenoic, palmitoleic, palmitelaidic oleic, ricinoleic, vaccenic, linoleic, linolenic, elaidic, eicosapentaenoic, behenic and erucic acids. Some unsaturated fatty acids may be monounsaturated, diunsaturated, triunsaturated, tetraunsaturated or otherwise polyunsaturated, including any omega unsaturated fatty acids.

In some embodiments, an effective stereospecificity is when at least one trans-unsaturated fatty acid or at least one saturated fatty acid is at the sn-2 position, and at least one unsaturated fatty acids are in the Sn1 and Sn3 positions. This particular geometry of these molecules, while promoting a first packing via the straight fatty acid chain with the linear saturated FAMEs, prevents further crystallization due to the steric hindrance presented by the two kinked chains.

In another embodiment, an effective stereospecificity is when at least one trans-unsaturated fatty acid or at least one saturated fatty acid is at the sn-1 position, and at least one unsaturated fatty acids are at the sn-2 and sn-3 positions. In another embodiment, an effective stereospecificity is when at least one trans-unsaturated fatty acid or at least one saturated fatty acid is at the sn-3 position, and at least one unsaturated fatty acids and/or at least one trans-unsaturated fatty acids are at the sn-1 and sn-2 positions.

In some embodiments, certain triacylglycerols, such as 1,3-dioleoyl-2-palmitoyl glycerol (OPO), disrupt the regular packing of the linear saturated FAMEs like MeP, delay crystal nucleation and mitigate crystal growth. OPO can participate in the crystalline of MeP since OPO has a structural component identical to MeP. OPO was shown to be able to mitigation of crystal growth by presence of the cis double bonds found in two of its carbon chains, thus increasing $\Delta G_d$ of the system.

In order to develop a better understanding of the phase behavior of the OPO-MeP binary system and its relationship to physical properties, several OPO/MeP mixtures at various molar fractions were investigated using differential scanning calorimetry (DSC). The OPO/MeP mixtures in specific cooling were crystallized from the melt using a constant cooling rate down to a temperature significantly below the melting point of both OPO and MeP to ensure that their crystallization was complete. The mixtures were subsequently reheated using the same rate. We detailed the phase development as observed during non-isothermal cooling and heating of the mixtures and presents the phase diagram of the OPO-MeP binary system constructed using the DSC melting characteristics. We also presented a simple thermodynamic modeling of the liquidus line in the phase diagram which allowed the identification of the molecular interactions involved and gaining insights into the intersolubility of OPO and MeP. We also detailed that DSC thermograms were used to construct detailed kinetic phase diagrams, encompassing the liquidus lines as well as the various transformations below the onset of crystallization. The liquidus line in the phase diagram obtained upon heating was modeled using the so-called Bragg-William approximation, a thermodynamic model based on the Hildebrand equation and taking into account non-ideality of mixing.

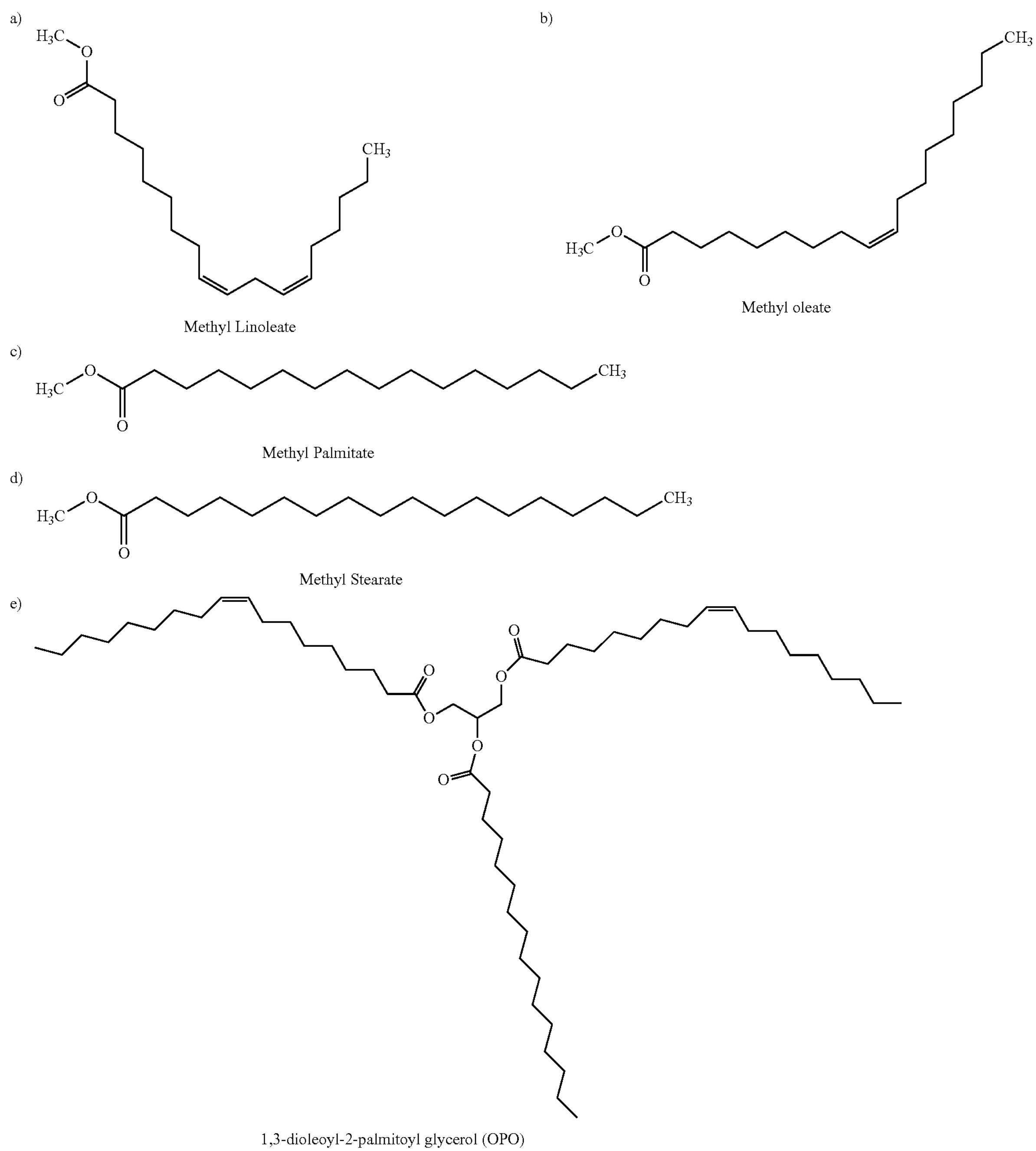

Unsaturated FAMEs: a) methyl linoleate (MeL), b) methyl oleate (MeO), saturated FAMESs: c) methyl palmitate (MeP) and d) methyl stearate (MeS), and the TAG e) 1,3-dioleoyl-2-palmitoyl glycerol (OPO).

Materials and Methods of Preparation of OPO and/or MeP Sample Preparation

OPO was synthesized and purified in our laboratories and the MeP was purchased (Aldrich Chemical Co. Inc.). Their purities were greater than 99% as determined by high performance liquid chromatography (HPLC). The OPO and MeP were mixed in 0.05 molar fraction increments (as shown as $X_{OPO}$, molar fraction being X=0, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1.0). The melted sample was homogenized using a mechanical stirrer.

Differential Scanning Calorimetry (DSC)

DSC measurements were carried out on a Q100 model (TA Instruments, New Castle, Del.) under a nitrogen flow of 50 mL/min. Approximately 4.0 to 5.0 (±0.1) mg of melted sample was placed in an aluminum DSC pan then hermetically sealed. An empty aluminum pan was used as a reference. The sample was fully melted and held for 5 min at 80° C. in order to erase crystal memory. It was then cooled at a rate of 5 K/min down to −90° C., a temperature at which crystallization was deemed complete. The sample was equilibrated at this temperature for 5 min and subsequently reheated to 80° C. at a rate of 2 K/min to record the melting cycle.

The "TA Universal Analysis" software was used to analyze the data and extract the main characteristics of the peaks (peak ($T_p$), onset ($T_{On}$) and offset ($T_{Off}$) temperatures, and enthalpy (ΔH). Non-resolved peaks were located using first and second derivatives of the heat flow versus temperature curve.

Results and Analysis

Crystallization Behavior

Figure 1B:
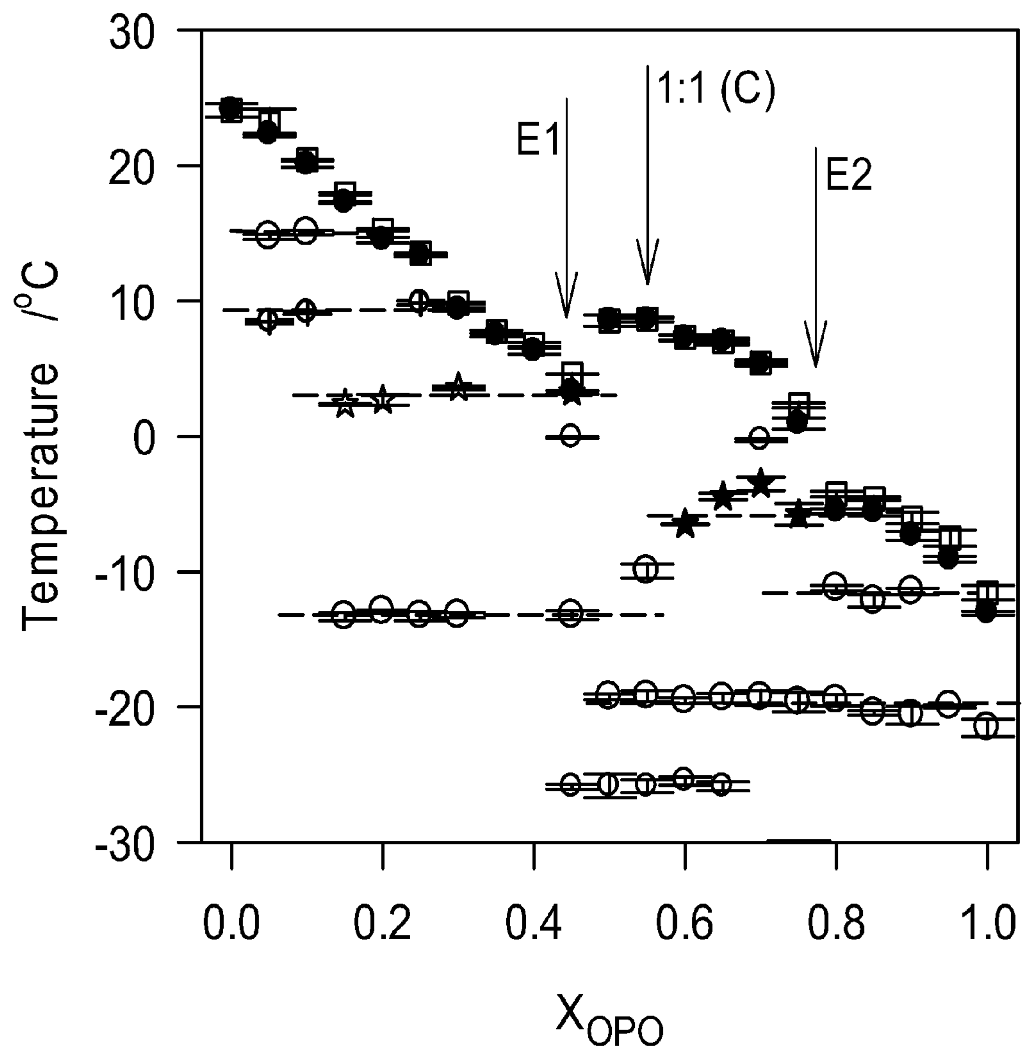
FIG. 1*a*2** depict DSC cooling thermograms of MeP/OPO mixtures cooled at 5° C./min. The numbers on the right above each thermograph line indicates the molar fraction of OPO.

The DSC cooling thermographs of the OPO/MeP mixtures are displayed in FIG. 1*a*1 and 1*a*2 and the related crystallization characteristics ($T_{on}$ and peak temperatures, $T_p$) are shown in FIG. 1*b*. The onset of crystallization was very accurately recorded and the peak temperature was taken at the center of the thermal event and reported with an extra uncertainty value corresponding to half of its span (P1, $T_{p1}$~24.09±0.49° C., FIG. 1*a*1). As the concentration of OPO was increased, and up to $0.45^{OPO}$, a second exotherm (P2 in FIG. 1*a*1), probably associated with an OPO-rich phase, appeared at the lower temperature side. Peak temperature of P1 shifted almost linearly and reached an apparent eutectic at $0.45_{OPO}$ (Arrow 1 in FIG. 1*b*) with a eutectic temperature of 2.81±0.03° C.

On the OPO-rich side of the concentration range, the DSC cooling thermogram of pure OPO presented a two-step crystallization process with a small leading exotherm followed by a large peak (P1 at ~−12° C. and P2 at ~−20° C., FIG. 1*a*2). Interestingly, the addition of up to 20 mol % of MeP shifted the leading peak to higher temperature by 7° C. but did not affect the main peak indicating that MeP altered the overall transformation path but not the nature of the final crystal structure of the TAG. As can be seen in FIG. 1*a*2, the height of the leading peak increased relatively substantially with increasing MeP, indicating that MeP involvement at the early stages of the crystallization process of OPO, i.e., nucleation, is important. The intermediary peak appearing at ~−12° C. also indicates that MeP is involved in the formation of the first lamellae, probably in a mixed phase with OPO. Furthermore, peak height of the main exotherm, P2, decreased and its FWHM increased steadily suggesting that at these concentration levels, MeP noticeably increases the OPO phase disorder and leads to the formation of more inhomogeneous networks. The $0.75_{OPO}$ mixture presented experienced a sudden shift of its $T_{on}$ to higher temperature and a noticeable increase in the intensity of its leading peak. This change in phase development is particularly reflected by a "jump" in the liquidus line of the cooling phase diagram of the OPO/MeP binary system (arrow 2 in FIG. 1*b*).

While the leading exotherm (P1) observed in the $0.75_{OPO}$ mixture remained relatively strong as MeP content was increased, the low temperature peak (P2) broadened and decreased noticeably, and disappeared for the $0.55_{OPO}$ and $0.50_{OPO}$ mixtures. These two last mixtures are also particular as they form a maximum in the liquidus line of the cooling phase diagram of the binary system (Arrow M, FIG. 1*b*); a clear indication of the formation of a 1:1 (mol:mol) compound. The experimental phase diagram obtained on cooling displays in fact two eutectics (at $0.45_{OPO}$ and $0.80_{OPO}$) separated by the singularity (at $0.55_{OPO}$, $T_M$=8.64±0.18° C.). Note that as suggested by the DSC traces of the mixtures with $X_{OPO}$ between 0.5 to 0.65, the phase of this compound is probably dominant over a sizable concentration range.

The complexity of the transformations occurring in this binary systems is revealed by the several transformation lines shown in the phase diagram (dotted lines, FIG. 1*b*). Although most of them understandably involved little enthalpy of transformation, eutectic lines (at ~3° C., spanning from $0.15_{OPO}$, to $0.45_{OPO}$ and ~−5.5° C., spanning from $0.60^{OPO}$ to $0.80_{OPO}$) as well as possible metatectic lines (at ~9° C., spanning from $0.05_{OPO}$ to $0.30^{OPO}$ and at ~15° C., spanning from $0.05_{OPO}$ to $0.20_{OPO}$) can be noticed.

Melting Behavior and Phase Development

The DSC traces of the OPO/MeP mixtures obtained upon heating (FIGS. 2*a*1 and a2) revealed the multiphase nature of the OPO/MeP system and the complexity the transformation paths that are possible for the OPO/MeP mixtures. The two pure constituents of the system displayed quite different melting behaviors and had profound and distinct effects on each other. One can clearly notice that the melting behavior of MeP is profoundly affected by the addition of OPO at very low concentration and induced several thermal events in the mixtures. OPO is relatively resilient to the influence of MeP and the phase development of the OPO-rich mixtures seems to be mainly driven by recrystallizations from the melt as evidenced by the initial multiple exothermic events observed in their DSC heating thermograms (arrows in FIG. 2*a*2).

The multiple "recrystallizations" span over a very large temperature range (~37.7° C. in the case of pure OPO). The transformation path of pure OPO and OPO-rich mixtures (up to $0.80_{OPO}$) is a succession of at least two direct recrystallizations, from the pre-existing phase(s) which formed upon cooling into more stable phases followed by their subsequent melt as evidenced by the well-resolved endotherms. The high temperature endotherm ($T_p$=19.8° C.) observed in the thermogram of OPO is probably the recording of the melting of the most stable phase of OPO that is reachable with the thermal protocol used, i.e., $\beta_1$. This endotherm remained strong and sharp (FWHM ~2.3° C.) even with 10% of MeP, indicating that the very well-organized OPO crystal phase is not significantly affected at these levels. The heat flow recorded for the exothermic transformations did not weaken significantly as OPO was added, suggesting that a pure OPO phase was still developing. However, shoulders appeared at the lower temperature side as soon as MeP was added, a sign that another phase, probably a MeP phase, was forming. As MeP content was increased, $T_p$ of the last endotherm decreased steadily from a value of ~19.6° C. for the pure TAG, to ~11.5° C. at the $0.80_{OPO}$ composition, indicative of an apparent eutectic (Arrow 1 in FIG. 2*b*).

The heating trace of pure MeP presented two overlapping peaks ($T_{p1}$~29° C. and $T_{p2}$~30° C.) attributable to the melting of two very close crystal phases. Such a thermogram has been previously reported and attributed without further evidence to a polymorphic transition followed by the complete melting of MeP. However, it is more likely that this is the recording of the successive non-resolved melting of two coexisting crystal phases of MeP (both β') formed upon the non-isothermal cooling. The effect of OPO on the transformation path of MeP is noticeable even at small concentrations as illustrated by the variety of thermal events presented by the MeP-rich mixtures. The addition of even small amounts of OPO to MeP induced a noticeable broadening of the melting window in which a large number of transitions were available for the system. The $0.05_{OPO}$ to $0.25_{OPO}$ mixtures, for example, presented five additional well-resolved endotherms. Note also that no exotherm was recorded for the mixtures having less than 45% OPO. The increase in OPO concentration causes a sharp decrease of $T_{off}$ (and $T_p$ of the last endotherm) of ~16° C. from the pure TAG to the $0.45_{OPO}$ composition at which point a second eutectic is demonstrated by the binary system (Arrow 2 in FIG. 2*b*).

The mixtures between the two eutectics, i.e., those with OPO content between 45 to 70%, presented relatively simpler heating traces with two prominent endotherms separated by a very sharp exotherm indicating the recrystallization from the melt of a homogeneous phase. Furthermore, the offset temperature of melting of these mixtures (as well as the $T_p$ of the last endotherm) presented a marked maximum at $0.50_{OPO}$ (Arrow M in FIG. 2*b*). This type of singularity in the phase diagram is indicative of the formation of a 1:1 (mol:mol) compound which forms a eutectic with each pure component. Clearly, specific intermolecular interactions between OPO and MeP are at play and have a profound impact on the phase development and intersolubility of the OPO/MeP binary system.

Figure 2B:
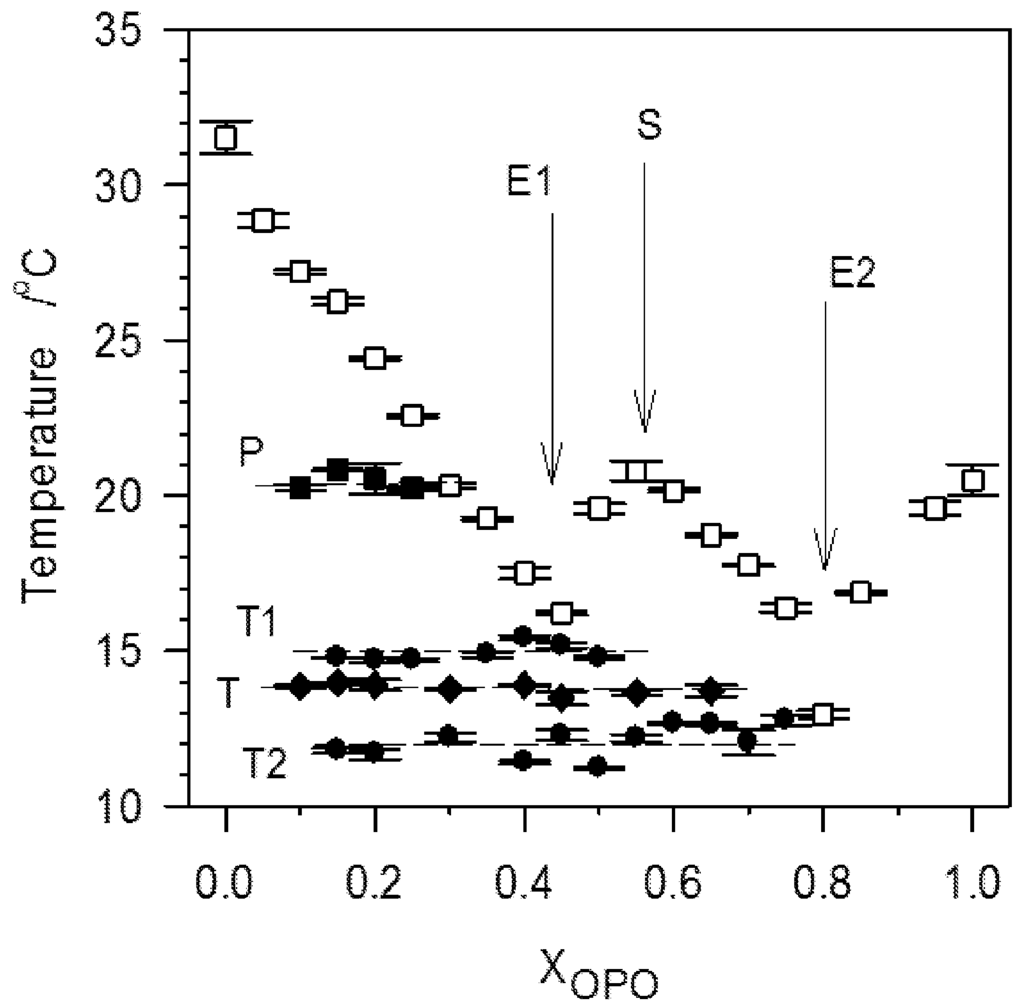

Two eutectic lines can be clearly distinguished (E1 at ~16° C. and E2 at ~11.5° C., FIG. 2*b*). The first eutectic line (E1, FIG. 2*b*) is related to the "MeP-Compound" system and the second (E2, FIG. 2*b*) to the "OPO/Compound" system. A solid-solid transition is present between the two eutectic lines at ~14° C. (T line, FIG. 2*b*). The endothermic peak associated with the 16° C. eutectic line was first observed at $0.20_{OPO}$. As OPO concentration increases, the height of this peak reached a maximum at $0.40_{OPO}$ at which point it decreased to disappear at $0.55_{OPO}$. This Tamman plot-like enthalpy supports the existence of such a eutectic and delimits the eutectic transformation range.

There is no obvious peritectic point. The transformation line located at ~21° C. from $0.15_{OPO}$ to $0.30_{OPO}$ (■ in FIG. 2*b*) may be attributed to a metatectic reaction. The endothermic peak related to this transformation appeared first for $0.15_{OPO}$ as a small shoulder to the last endotherm then developed into a more resolved peak as OPO content is increased.

The compound appears to be a key player in the crystallization behavior of the MeP/OPO binary system. Noticeably, the TAG by forming a compound with MeP perturbs the crystallization in a very noticeable way. The formation of abrupt eutectics between the compound and the pure constituents reflects the complexity of the interactions involved and hence the solubility behavior and subsequent nucleation processes driving the phase development in this system.

Thermodynamic Analysis of the Liquidus Line

The last endotherm, and particularly $T_{off}$ (● in FIG. 3) was used to determine the liquidus line in the kinetic phase diagram of the OPO/MeP binary system, as typically done in the study of binary lipid mixtures. This point is suitable for studying equilibrium properties because it is determined by the most stable crystal. Note that peak temperatures ($T_M$) of the other peaks were used to represent the solid-solid transition lines and the solidus line after correction for the transition widths of the pure components. The complete kinetic phase diagram of the OPO/MeP binary system constructed using the temperatures characteristic of the heating cycles was displayed in FIG. 2*b* and discussed earlier.

A thermodynamic model based on the Hildebrand equation (Hildebrand, 1929). coupled with the Bragg-William approximation for non-ideality of mixing (Bragg and Williams, 1934) was used to simulate the liquidus line in the phase diagram. This model is commonly used to investigate the miscibility in studies of binary mixtures of lipids. It is based on the Hildebrand's equation which describes ideal mixing behavior. In this case, the liquidus line is modelled by the following two equations depending on whether the composition is larger or smaller than the eutectic composition, XE;

$$\ln X_A = -\frac{\Delta H_A}{R}\left(\frac{1}{T} - \frac{1}{T_A}\right) \quad [1]$$

-continued $$\ln X_B = -\frac{\Delta H_B}{R}\left(\frac{1}{T} - \frac{1}{T_B}\right) \quad [2]$$

where R is the gas constant. $X_A$ represents the mole fraction of A, $\Delta H_A$ and $T_A$ are the molar heat of fusion and the melting point of component B, $X_B$, $\Delta H_B$ and $T_B$ are those of component B. Equation 1 is used when $X_E \le X_A \le 1$ and equation 2 is used when $0 \le X_A \le X_E$.

The Bragg-Williams approximation introduces a non-ideality of mixing parameter, ρ, given by:

$$\rho = z\left(u_{AB} - \frac{u_{AA} + u_{BB}}{2}\right) \quad [3]$$

where z is the first coordination number, $u_{AB}$, $u_{AA}$ and $u_{BB}$ the interaction energies for AB, AA and BB pairs, respectively.

For ideal mixing, the intermolecular interaction of like-pairs is equal to that of mixed-pairs and consequently ρ=0. Negative values of ρ reflect a tendency for pairing of unlike molecules (i.e. A-B), whereas, positive values of ρ indicate like pairing tendencies (i.e. A-A or B-B). The non ideality of mixing parameter, ρ, can therefore be used as an indication of the intersolubility of two molecules; a negative value would indicate a tendency for order and a positive value would reflect a tendency of like molecules to cluster indicating immiscibility order.

A modification of the Hildebrand equation using the Bragg-Williams approximation provides Equations 4 and 5 used to simulate the liquidus line, $$\ln X_A = -\frac{\rho(1 - X_A)^2}{RT} = -\frac{\Delta H_A}{R}\left(\frac{1}{T} - \frac{1}{T_A}\right) \quad [4]$$

$$\ln X_B = -\frac{\rho(1 - X_B)^2}{RT} = -\frac{\Delta H_B}{R}\left(\frac{1}{T} - \frac{1}{T_B}\right) \quad [5]$$

Equation 4 is used when $X_E \le X_A \le 1$ and equation 5 is used when $0 \le X_A \le X_E$.

The parameters $T_A$, $T_B$ $\Delta H_A$ and $\Delta H_B$ used to simulate the liquidus line are summarized in Table 1. The best fit liquidus line and subsequent value of ρ were calculated in two stages. T was calculated for each segment starting with an educated guess of the value of ρ and repeated using p increments of ±1 kJ/mol. The standard method of least squares approach was used to obtain the best fit. In this method the sum of squared residuals, i.e., difference between the observed value ($T_{exp}$) and the calculated value ($T_c$), is minimized. The value of ρ which yielded the smallest sum of squared residual was then used as the starting value to refine the fit. In the second stage, the ρ-value obtained in stage 1 was varied by smaller increments of ±0.01 kJ/mol and calculations are repeated until the sum of the squared residuals is minimized again, yielding a value of ρ that was deemed the best fit parameter. Note that smaller steps than 0.01 kJ/mol yield improvements in the fit that are smaller than the uncertainty attached to the measured data.

As expected, the calculated liquidus line assuming an ideal mixture using equations 1 and 2 did not reproduce the experimental liquidus line and is not shown. The experimental liquidus line has been very satisfactorily reproduced by considering the two eutectics separated by the singularity at $0.55_{OPO}$ and using Eq. (4) and (5) for each eutectic and a non-ideality of mixing parameter ρ for each branch (Table 1). The calculated ρ-values are comparable to published values for binary lipid systems The simulated four segments of the liquidus line (labeled I to IV) are represented by solid lines in FIG. 3. The singularity has been confirmed at $0.55_{OPO}$. The eutectic points obtained by the intersection of the two segments were confirmed at $0.40_{OPO}$ and $0.80_{OPO}$ and $T_E$ of 16° C. and 11.5° C., respectively.

TABLE 1

Parameters (Enthalpy of melting, $\Delta H_A$ and melting temperature, $T_A$) used in the Bragg - William approximation (Eq. 4) for the different segments of the liquidus line and values of the non-ideality of mixing parameter obtained.

| Segment | Region | $T_A$ (K) | $\Delta H_A$ (kJ/mol) | ρ (kJ/mol) |
|---|---|---|---|---|
| I | $0.0 \le X_A \le 0.40$ | 302.93 ± 0.63 | 27.6 ± 3.7 | 0.68 |
| II | $0.40 \le X_A \le 0.55$ | 293.95 ± 0.31 | 156.2 ± 5.3 | −58.48 |
| III | $0.55 \le X_A \le 0.80$ | 293.95 ± 0.31 | 156.2 ± 5.3 | −6.50 |
| IV | $0.80 \le X_A \le 1.0$ | 293.65 ± 0.51 | 123.5 ± 12.1 | −62.54 |

The simulation yielded negative values of ρ for all segments (Table 1) except the MeP rich region (Region I in FIG. 3) where it is 0.68 kJ/mol. The Bragg-Williams approximation attributes the origin of the non-ideality of mixing to the enthalpy term of the free energy of mixing and assumes the same entropy term as in the ideal mixing case. The non-ideality of mixing parameter, ρ, is the energy difference between (A−B) pair and the average of (A−A) pair and (B−B) pair (Equation 5). The value of ρ obtained for MeP-rich mixtures (region I) is a rather small value close to zero which indicates an ideal mixing behavior. On the OPO rich region (Region IV in FIG. 3) the fit yielded a ρ-value of −62.54 kJ/mol reflecting a strong tendency for order. This is a clear indication of strong molecular interactions which tend to favor the formation of OPO-compound pairs in the liquid state rather than OPO-OPO or compound-compound pairs. The negative values for p in the compound region indicate that unlike pairing is energetically favored between the OPO and the compound as well as between MeP and the compound (Table 1). Note, however, that the absolute value of ρ obtained for Region II is nine times greater than that for Region III, indicating that the tendency of unlike pairing with the compound is much more pronounced with MeP than OPO. This result and the very large value obtained for p in the TAG-rich region is an indication that disturbance of the MeP/OPO's crystal packing is significant even at low concentration of OPO in the MeP, or of MeP in the OPO.

Conclusion

The heating and cooling DSC thermographs obtained for OPO/MeP mixtures demonstrated complex phase trajectories with several thermal transitions including recrystallization from the melt. The liquidus line in the phase diagram constructed from the heating data presented two eutectics compositions, at $0.40_{OPO}$ and $0.80_{OPO}$ with eutectic temperatures at 15° C. and 12° C., respectively, separated by a singularity at $0.55_{OPO}$ indicative of the formation of a 1:1 compound. The application of the Bragg-William approximation to the experimental liquidus line indicated a relatively complex intersolubility of MeP and OPO in the liquid phase. The non-ideality of mixing parameter values indicated an ideal mixing behavior for the mixtures in the $X_{OPO}$=[0, 0.40] concentration range and a strong tendency for the formation of 'MeP-OPO' unlike pairs for all the other concentrations. The thermal data indicated that OPO disrupts the crystallization process at both the nucleation and growth stages and effectively delays the crystallization of MeP. The findings of this study indicate that additive formulations containing OPO in low concentrations may be used to measurably improve the cold flow properties, such as PP and CP, of biodiesel by disturbing the easy packing of linear FAMEs and repressing the crystallization temperature.

Studies of OSO and/or MeS

We have found that TAGs with two unsaturated fatty acids in the cis-configuration and at least one unsaturated fatty acid in the trans-configuration or at least one saturated fatty acid are highly functional in depressing the onset of crystallization of biodiesel. An effective stereospecificity is when at least one trans-unsaturated fatty acid or at least one saturated fatty acid is at the sn-2 position. This suggests that the particular molecular conformation of these TAGs has a profound effect on the cold flow properties of biodiesel. It has been hypothesized that the peculiar geometry of the TAG molecules which present a kink together with a straight fatty acid chains may disrupt the packing of the FAMEs at the nucleation stage and delays significantly crystallization.

In order to understand the fundamental FAME-TAG interactions and shed light on the mechanisms at the origin of the crystallization delay observed in biodiesel induced by the addition of mono- and di-unsaturated TAGs, we performed a series of binary phase behavior studies of the most important FAMEs composing biodiesel and their cis-unsaturated TAG counterparts. The following describes the phase behavior of methyl stearate (MeS), a component of biodiesel with one of the highest melting points, and 2-stearoyl diolein (OSO).

The crystal structure, crystallization and phase development, microstructure, and solid fat content (SFC) of OSO/MeS mixtures were tested using X-ray diffraction (XRD), differential scanning calorimetry (DSC), polarized light microscopy (PLM) and wide-line pulsed nuclear magnetic resonance (pNMR), respectively. The DSC heating thermograms were used to construct a detailed kinetic phase diagram, encompassing the liquidus lines as well as the various transformations below the cloud point. Thermodynamic analysis of the phase diagram was performed in order to provide an understanding of the intermolecular interactions, intersolubility and possible eutectics which can be used to beneficially alter low temperature characteristics of biodiesel.

Materials and Methods of Preparation of OSO and/or MeS

Materials

Methyl stearate (MeS) purchased from Sigma-Aldrich (Oakville, Ontario) at a claimed purity of 96% was further purified in our laboratory to better than 99%. OSO was synthesized in our laboratory according to known procedures with a purity exceeding 99%. The purity of MeS was determined by GC-FID. The sample was run as is in chloroform, using a Zebron Capillary GC (ZB-5HT Inferno) Column (Terrance, Calif., USA). OSO purity was determined by a Waters Alliance (Milford, Mass.) e2695 HPLC system fitted with a Waters ELSD 2424 evaporative light scattering detector. The purified OSO and MeS were mixed in the desired molar fractions ($X_{OSO}$, molar fraction being X=0, 0.05, 0.25, 0.40, 0.50, 0.55, 0.60, 0.65, 0.70, 0.75, 0.85, 0.95 and 1.00), then heated at 80° C. and stirred for 5 min to ensure complete homogeneity. Special care was taken for the overall handling and storage (4° C.) of the samples.

Thermal Processing

The samples were subjected to the same thermal protocol to allow for comparison between the different techniques used. The sample was first equilibrated at 80° C. for 5 min, a temperature and a time over which crystal memory was erased, and cooled with a constant rate (5 K/min) down to −40° C. For DSC and SFC measurements, the sample was subsequently held at −40° C. for 5 min then reheated to 80° C. at a constant rate of 2.0 K/min to obtain the melting profiles. All measurement temperatures are reported to a certainty of better than ±0.5° C.

Analytical Methods

X-ray Diffraction

A Panalytical Empyrean X-ray diffractometer (PANalytical B. V., Lelyweg, The Netherlands) equipped with a filtered Cu-$K_\alpha$ radiation source ($\lambda$=0.1542 nm) and a PIXcel$^{3D}$ detector was used in line-scanning mode (255 lines over 3.347 degree wide detector) for XRD measurements. The XRD patterns were recorded between 1.2 and 60° (2θ) in 0.026° steps, at 45 kV and at 40 mA. The procedure was automated and controlled by PANalytical's Data Collector (V 3.0c) software. The samples were processed as described above in the XRD chamber using a 700 Series Cryostream Plus cooling system (Oxford Cryosystems, Oxford, UK) fitted to the diffractometer. The temperature was controlled to better than ±0.5° C. The data were processed and analyzed using the Panalytical's X'Pert HighScore V3.0 software. We refer to the range 2θ=[1.2°-15°] and [15°-60°] as the small- and wide-angle scattering regions, respectively.

Differential Scanning Calorimetry

The DSC measurements were carried out under a nitrogen flow of 50 mL/min on a Q200 model (TA Instruments, New Castle, Del.). Sample of approximately 0.4 to 0.6 (±0.1) mg in a hermetically sealed aluminum DSC pan was processed as described herein. The "TA Universal Analysis" software coupled with a method developed by our group was used to analyze the data and extract the main characteristics of the peaks (peak temperature, $T_p$; onset temperature, $T_{On}$; offset temperature, $T_{Off}$; enthalpy, ΔH; and full width at half maximum, FWHM). The temperature window over which a thermal event occurs is defined as the absolute value of the difference between $T_{Off}$ and $T_{On}$ of that event. Subscripts C and M are used for crystallization and melting, respectively. The positions of non-resolved thermal events were estimated using the first and second derivatives of the differential heat flow and their other characteristics were simply estimated using the software elements.

Data Analysis and Modeling

X-Ray Data Analysis and Polymorphism of Triacylglycerols

The crystal structures are described by the layering type in the structure and the type of the subcell structure within the layers as usually done for TAGs. The main subcell hydrocarbon-chain packing modes are commonly denoted as the α, β' and β polymorphs. The chain packing of the α-polymorph is hexagonal with nonspecific chain-chain interactions and is characterized by one strong wide-angle line in the XRD pattern at a lattice spacing of ~4.2 Å, originating from the $(100)_\alpha$ basal plane reflection. A transformation of the structure of the α-phase into a so-called sub-α-form may occur at low temperature due to a distortion of the hexagonal subcell.

The common subcell packing of the β'-polymorph is orthorhombic, with the alternate acyl chains packing in planes perpendicular to each other ($O_\perp$) and is characterized by two strong wide-angle lines at lattice spacings of 4.2-4.3 Å originating from the $(110)_{\beta'}$ reflection and 3.7-3.9 Å originating from the $(200)_{\beta'}$ reflection.

The hydrocarbon chains of the β-polymorph are commonly packed parallel to each other in a triclinic (or monoclinic, if the angles α and γ are 90° C.) parallel subcell ($T_{\parallel}$). The β-form is characterized in the wide-angle region by a lattice spacing of ~4.6 Å originating from the $(010)_\beta$ reflection and a number of other strong lines around 3.6-3.9 Å. The β-polymorph is the most stable crystal form, with the highest melting temperature, and the α-polymorph is the least stable crystal form, with the lowest melting temperature.

The hydrocarbon chain layering is responsible for the characteristic small-angle (long-spacing) reflections. The d-value of the first order (001) reflection represents the thickness of the molecular layers. Higher order (00l)-reflections indicate regular, periodic structures and represent the periodical sequence of electronic density differences in multiple layers. In the case of hydrocarbons, such as alkanes, the series of (00l)-peaks originates from the region of lower scattering density in the gap between the layers. The period of layers along the layer normal observed for TAG structures is usually proportional to the acyl chain lengths by a factor of two or three, suggesting a double-chain length (DCL) or a triple-chain length (TCL) packing.

Thermodynamic Analysis of the Boundaries in the Phase Diagrams

The kinetic phase diagram was constructed using the data generated in the DSC heating experiments. A simple thermodynamic model based on the Hildebrand equation coupled with the Bragg-William approximation for non-ideality of mixing was used to simulate the phase boundaries in the phase diagram and to investigate the miscibility of the components. This model is a powerful tool commonly used to study lipid mixtures.

The Bragg-Williams approximation attributes the origin of the non-ideality of mixing to the enthalpy term of the free energy of mixing and assumes the same entropy term as in the ideal mixing case. The deviation from an ideal behavior is described by a non-ideality of mixing parameter, ρ (J/mol), defined as the difference in the energy of mixed-pairs (A–B) and the average pair interaction energy between like pairs (A–A and B–B) formed in the mixture:

$$\rho = z\left(u_{AB} - \frac{u_{AA} + u_{BB}}{2}\right) \quad (8)$$

where z is the first coordination number, $u_{AB}$, $u_{AA}$ and $u_{BB}$ the interaction energies for AB, AA and BB pairs, respectively.

According to this approximation, the two branches of an equilibrium liquidus line are described by the following equations depending on whether the composition is smaller or larger than the eutectic composition $X_E$:

$$\ln X_A + \frac{\rho(1 - X_A)^2}{RT} = -\frac{\Delta H_A}{R}\left(\frac{1}{T} - \frac{1}{T_A}\right) \quad (9)$$

$$\ln X_B + \frac{\rho(1 - X_B)^2}{RT} = -\frac{\Delta H_B}{R}\left(\frac{1}{T} - \frac{1}{T_B}\right) \quad (10)$$

where R is the gas constant, $X_A$ represents the mole fraction of A, $\Delta H_A$ and $T_A$ are the molar heat of fusion and the melting point of component A, $X_B$, $\Delta H_B$ and $T_B$ are those of component B.

For ideal mixing, the intermolecular interaction of like-pairs is equal to that of mixed-pairs and consequently ρ=0 and the Hildebrand equation is obtained. A negative ρ is obtained when the formation of AB pairs is energetically more favorable than AA or BB pairs and reflects a tendency for order. A positive ρ is obtained when mixed-pair formation is energetically less favorable and reflects a tendency of like molecules to cluster, which beyond some critical value leads to phase separation.

Results and Analysis-Crystallization and Polymorphism

Selected XRD patterns of the different OSO/MeS mixtures obtained at −20° C. are shown in FIGS. **4*a*1, 4*a*2 and 4*a*3, and 4*b*** for the wide-angle and small-angle region, respectively. Relevant XRD data are listed in Table 2. As can be seen, the polymorphism of the OSO/MeS binary system is complex. Note that except for pure MeS, a liquid phase is still present at the measurement temperature in all the mixtures as evidenced by the wide background halo in the XRD patterns. The contribution of the liquid phase to the XRD signal has been subtracted from the pattern before analysis of the crystal peaks.

The characteristic lines of three different symmetries (monoclinic, triclinic and orthorhombic) were unambiguously detected. Relevant peak positions and Miller indices are listed in Table 2. The concentration regions where the different crystal phases are detected are shown in FIG. 5. XRD pattern of pure MeS has been fully identified using the Powder Diffraction File (PDF) database of the ICDD and found matching perfectly reference No 00-032-1764. MeS crystallized in the monoclinic form (labeled $\beta_M$) in the I2/a space group. The OSO-rich mixtures [$0.65_{OSO}$ to $1.0_{OSO}$] crystallized mainly in the orthorhombic form as evidenced by the predominance of the characteristic reflections of the β'-polymorph (3.7 Å and 4.13 Å originating from the (200) and (010) family of planes, respectively). The β'-phase persisted in all the mixtures with OSO content higher than 25%. A third phase having the triclinic symmetry ($\beta_T$-form) was detected in the $0.05_{OSO}$ to $0.65_{OSO}$ mixtures.

The signature peak of the $\beta_M$ form, the $(\overline{1}011)$ reflection at d-spacing of 4.07 Å, is present with a quantifiable intensity up to the $0.65_{OSO}$ mixture and as a trace shoulder to the main peak of the β'-polymorph ($d_{010}$=4.12 Å) for the mixtures with higher OSO content. The relative content of $\beta_M$, as calculated from the relative intensity of the $(\overline{1}011)$ reflection decreased noticeably with increasing OSO content up to 65% (FIG. 5) at which it can be statistically considered no longer present.

TABLE 2

WAXD data of OSO/MeS mixtures obtained at −20° C. Miller indices of typical characteristic peaks of the β-form (Monoclinic and Triclinic) and β'-form (Orthorhombic) are shown alongside their respective d-spacings.

| Monoclinic ($\beta_M$) | | Triclinic ($\beta_T$) | | Orthorhombic (β') | |
|---|---|---|---|---|---|
| $d_{hkl}$ (Å) | hkl | $d_{hkl}$ (Å) | hkl | $d_{hkl}$ (Å) | hkl |
| 4.45 | (011) | 4.51 | (100) | 4.20 | (110) |
| 4.32 | $(\overline{6}11)$ | 4.12 | $(0\overline{1}1)$ | 3.70 | (200) |
| 4.08 | $(\overline{1}011)$ | 3.65 | $(\overline{1}00)$ | | |
| 3.07 | 121 | | | | |
| 2.44 | (330) | | | | |

Both the $(\overline{1}00)_T$ and $(010)_T$ reflections of the triclinic form (lines at 3.65 and 4.50 Å, respectively) were first detected in the XRD pattern of the $0.05_{OSO}$ mixture and disappeared after $0.65_{OSO}$. Note that when OSO content was increased and up to $0.50_{OSO}$, the relative intensity of $(010)_T$ increased, whereas, that of $(\overline{1}00)_\beta$ decreased sharply (FIGS. **4*a*1 and 4*a*2**). The intensity of both peaks remained constant afterwards, a very clear indication of the peculiarity of the $0.50_{OSO}$ mixture. Note that a refined fit of the wide signal shouldering the $(\overline{1}011)$ line (d=4.07 Å) in the XRD patterns of the $0.40_{OSO}$ to $0.65_{OSO}$ mixtures yielded two small peaks at d=4.12 and 4.18 Å suggesting that a β'-phase may also be present in these mixtures. This would indicate that even at these relatively high MeS concentrations, a very small amount of OSO was crystallized in its orthorhombic form. However, this is not unambiguously established, due to the relatively large liquid phase in these samples.

The XRD data collected in the wide-angle region singled out three groups of mixtures with fundamentally different polymorphism (FIGS. **4*a*1, 4*a*2, and 4*a*3**): (1) an exclusive β'-phase in the OSO-rich [$0.70_{OSO}$-$1.0_{OSO}$] mixtures range, (2) a dominating monoclinic phase in the MeS-rich [$0.0_{OSO}$-$0.25_{OSO}$] mixtures range, and (3) a dominating β-phase in the triclinic form for the intermediary mixtures.

TABLE 3

SAXD data of OSO/MeS mixtures obtained at −20° C. Uncertainty attached to $d_{00l}$ ~±0.15 Å.

| | l | | | | |
|---|---|---|---|---|---|
| $X_{OSO}$ | 1 $d_{00l}$ (Å) | 2 | 3 | 4 | 6 |
| 0-0.25 | 47.79 | 23.99 | 15.95 | 12.00 | 8.00 |
| | 49.47 | 24.61 | | 12.35 | 8.23 |
| 0.40-0.65 | 44.74 | 22.73 | 14.78 | | |
| 0.70-1.0 | 53.05 | 26.55 | | 13.37 | |
| | 56.00 | 28.01 | | | |

In the small-angle region, several distinct peaks appeared in the XRD patterns (FIG. **4*b*). The reflections have successive d-spacings of $d_1$: $d_2$: $d_3$ . . . exhibiting ratios which can be directly related to specific (00I) families of planes making the indexation of the planes straight forward (Table 3). The indexation is also confirmed by published data for MeS and OSO. Interestingly, the patterns obtained in the small-angle region evidenced the same three groups of mixtures singled out by the wide-angle region with each group presenting the same series of reflections. The information provided by the small-angle region complements that of the wide-angle region. The three distinct layerings are (FIG. 6*b***):

(1) The MeS-rich mixtures ($X_{OSO}$<0.40) presented two very series of 8 reflections each (I=1 to 8, series 1 with $d_{001}$=47.64 Å and series 2 $d'_{001}$=49.45 Å) which are exemplified by the XRD pattern of pure MeS. The two series are characteristic of a parallel and perpendicular lamellar periodicity of the monoclinic crystal structure. These reflections match those of the reference pattern No 00-032-1764 of the PDF database and can therefore be undoubtedly assigned to the DCL packing of MeS. Note that the reflections lose in intensity as OSO content is increased indicating that the electronic environment which gave rise to a chain layering reminiscent of MeS was altered. Note that there is no line that can be obviously be attributed to an OSO phase in this group.

(2) The small-angle XRD data collected for the OSO-rich mixtures ($X_{OSO}$>0.65) show also two series of 3 reflections each (I=1, 2 and 4, series 1 with $d_{001}$=53.05 Å and series 2 $d'_{001}$=55.99 Å). The intensity of (001) and (002) did not vary with concentration and there is no obvious feature that can be unambiguously attributed to MeS. The crystal features of OSO seem to overwhelm those of MeS for this group of mixtures. The series are therefore assigned to the chain layering of OSO. Note that only the β'-form has been detected in the $0.70_{OSO}$ to $1.0_{OSO}$ group of mixtures and therefore, the two series can be assigned to the parallel and perpendicular lamellar periodicity of the orthorhombic crystal structure.

(3) The $0.40_{OSO}$ to $0.65_{OSO}$ mixtures presented only one series of reflections (I=1, 2, 3 and 4) with $d_{001}$=44.75 Å, outlining again the peculiarity of this range of mixtures. The reflections lines (001) and (003) of these mixtures are well resolved, appear at the same positions and have the same intensity in all the mixtures of the range, indicating the same chain layering and length. The intensities of the reflections of this group did not significantly change for the different mixtures. Note that the (003) reflection is much stronger than its counterpart in the other groups indicating a completely different electronic environment, particularly MeS or OSO. This can be explained by a regular arrangement of OSO in a MeS matrix. The relatively large width of the 003 line suggests the arrangement in the layer direction is probably very disordered.

The XRD data, particularly the presence of singularities at the $0.50_{OSO}$ mixture, support the presence of a 1:1 compound in the $\beta_T$-form in the mixtures having more than 25% and less than 70% of OSO, and coexisting with a monoclinic phase made of MeS in the MeS rich side ($X_{OSO}<0.50$) and with an orthorhombic (β')-phase made of OSO in the OSO rich side ($X_{OSO}>0.50$). The width of the peaks associated with the compound is relatively large indicating that its phase was not homogeneous and its structure not well ordered and may be explained by loosely bound MeS-OSO pairs probably due to the crystallization being non complete. The chain layering displayed by the $0.40_{OSO}$ to $0.65_{OSO}$ mixtures is also consistent with a disordered and inhomogeneous MeS/OSO compound.

Crystallization Behavior

The DSC cooling thermograms are displayed in FIG. 6*a* and the corresponding characteristic temperature in FIG. 6*b*. Noticeably, the overall transformation path of the OSO/MeS binary system during cooling is quite complex and is strongly affected by concentration. The cooling thermogram of the $0.50_{OSO}$ mixture delineates two groups of mixtures with different features indicative of qualitative differences in crystallization behavior. The variety of resolved exotherms showing between two main peaks in both groups (FIG. 6*a*) and related marked changes in the crystallization values (FIG. 6*b*) highlight the diversity of phase developments occurring in the OSO/MeS binary mixtures.

The cooling thermogram of pure MeS presented a unique sharp (FWHM=0.43±0.03° C.) and very intense exotherm ($P_{MeSt}$) centered at 33.27±0.01° C. whereas the thermogram of pure OSO displayed one main relatively broad (FWHM=2.37±0.02° C.) exotherm at ~−10.41±0.13° C. preceded by a small shouldering peak (5.75±0.88° C.) ($P_{OSO}$ and S in FIG. 6*a*, respectively). This illustrates the qualitative difference in the ways the two molecules crystallize due their very different structural conformations. The linear MeS packs in its final and most stable crystal form (monoclinic) very rapidly without any structural hindrance, as evidenced by its small FWHM, whereas OSO, with two kinks at the sn-1 and sn-3 positions, transforms to its final crystal structure (orthorhombic) from a small initial crystal via a path which depends on the processing conditions used (5° C./min). Note that the leading exotherm (S in FIG. 6*a*) is prolonged and loses little of its height along the transformation path, indicating a process, probably dominated by continuous nucleation rather than growth of pre-existing nuclei. This suggests that lamellar structures are formed in the melt as the temperature is lowered (starting crystals or seeds) but do not grow significantly until the onset of the final phase is reached (i.e., at the onset of the main peak, $P_{OSO}$), at which point they grow almost simultaneously. Due to the relatively small difference in $T_p$ of the leading and main exotherm (~5° C.), the "seeds" were probably orthorhombic (β'), the polymorph which was detected at low temperature by XRD.

The plot of the characteristic crystallization temperatures versus OSO molar ratio (FIG. 6*b*) highlights two different crystallization behaviors delimited by the $0.40_{OSO}$ mixture. Substantial differences in span of crystallization, number of transitions and nature of phase development are evident between the two concentration ranges. A noticeable point of change is observed in the offset (FIG. 6*b*) as well as enthalpy of crystallization, $\Delta H_c$, versus OSO content curves at the $0.4_{OSO}$ concentration (FIG. 6*c*). $\Delta H_C$ which is almost constant (246±16 J/g) for $0.0_{OSO}$ to $0.40_{OSO}$ mixtures decreased exponentially to reach ~63±16 J/g for the mixture with $X_{OSO}$ higher than 0.60. A faint singularity separating both the onset and peak temperatures of crystallization versus $X_{OSO}$ in two segments is also noticeable at the $0.40_{OSO}$ mixture by slightly different slopes of the two segments.

For convenience and clarity, the crystallization path of the OSO/MeS binary mixtures will be discussed in terms of the effect of OSO on MeS and of MeS on OSO for the group of mixture with concentrations below and above $0.50_{OSO}$, respectively, acknowledging that the crystallization behavior of the system can be equally described and evaluated differently. As MeS content was increased from $0.55_{OSO}$ to $1.0_{OSO}$ the leading exotherm shifted to higher temperature while extra resolved exotherms developed on the transformation path leading to the main exotherm, indicating a qualitative change in the phases involved. It is likely the manifestation of a direct participation of the MeS molecules in the formation of the first lamellar units which further transform into the same crystal form. As more MeS is added, the amount of the early phase increased relatively slowly up to the $0.50_{OSO}$ mixture (see the increase of the leading exotherm height for the mixtures with less than 50% MeS in FIG. 6*a*) than very noticeably above, up to the pure MeS. This is a clear indication of the direct involvement of MeS in the early stages of OSO crystallization as a component of an OSO-MeS mixed phase. As MeS content was increased to 50%, the peak temperature of $P_{OSO}$ remained almost constant, widened noticeably and its height decreased almost linearly to completely disappear in the $0.50_{OSO}$ mixture. This clearly indicates that the crystal phase with OSO characteristics remains predominant but loses gradually its homogeneity and disorganizes with the incorporation of more of the FAME. $P_{OSO}$ can be safely assigned to a well-defined polymorphic phase, the β'-phase as is evidenced by XRD.

On the MeS side of concentrations, the intensity of $P_{MeSt}$ decreased noticeably as OSO content was increased and its peak shifted to lower temperature, practically linearly up to $0.50_{OSO}$ (FIG. 6*b*), after which it became confounded with the leading shoulder. One can safely assign $P_{MeSt}$ to the crystallization of a phase made predominantly, if not exclusively, of MeS. Three other distinct exothermic events appeared as early as in the $0.05_{OSO}$ mixture (arrows in FIG. 6*a*) indicating the growing effect of OSO on the crystallization of the mixtures. Note that as OSO content was increased, the two exotherms following $P_{MeSt}$ shifted to lower temperatures so far as to align with the second and third peaks of the prolonged leading event which appeared in the $0.55_{OSO}$ to $1.0_{OSO}$ mixtures, suggesting again the formation of a mixed MeS-OSO phase. While the intensity of the last exotherm of the $0.0_{OSO}$ to $0.40_{OSO}$ mixtures (peak at ~10° C. in FIG. 6*a*) increased noticeably with increasing OSO content, its peak temperature remained almost the same (FIG. 6*b*), suggesting a phase in which OSO is the dominant contributor to crystallization. At the low temperature end of this last exotherm one can see a small shoulder which appears to be slowly increasing and shifting to low temperature and reaches the value recorded for $P_{OSO}$ for the $0.60_{OSO}$ mixture. This last exotherm is probably associated with a very inhomogeneous and disorganized small phase made exclusively of OSO.

Melting Behavior and Phase Development

The pattern of thermal behavior during heating (2° C./min) of the OSO/MeS binary system is relatively complex and depends strongly on OSO concentration (FIG. 7*a*). Pure MeS presented a unique and large endotherm characteristic of the melting of its monoclinic phase. Four extra resolved endotherms are observed for the $0.05_{OSO}$ and $0.25_{OSO}$ mixtures and only two endotherms for the 0.40 mixture. The $0.5_{OSO}$ mixture presented one endotherm (20.75±0.04° C.). The heating thermograms of these mixtures did not display any exotherms suggesting the melting of different phases comprising both OSO and MeS. Note the increasing height of the extra endotherms showing the growing effect of OSO.

All the mixtures with more than 50% OSO presented heating thermograms with common transformation features. The sequence of phase transitions recorded for these mixtures started with two relatively wide exotherms, albeit small in the case of the $0.55_{OSO}$ and $0.60_{OSO}$, followed by two or three resolved endotherms (FIG. 8*a*), suggesting a complex polymorphism driven mainly and increasingly by OSO transformations. The onset and peak temperature of the first exotherm shifts linearly to lower temperature with increasing $X_{OSO}$. However, the shift is relatively small (−7.5 to −5.2° C.) suggesting the occurrence in these mixtures of a direct recrystallization (solid-solid transformation) from the same pre-existing β'-phase. The last endotherm appearing for these mixtures can be safely related to the melting of an OSO rich β-phase recrystallized from the melt.

The plot of the characteristic melting temperatures versus OSO molar ratio (FIG. 7*b*) highlights also the peculiarity of $0.40_{OSO}$ mixture. Differences in span of melt, number of transitions and nature of phase development are also evident between the two concentration ranges. A noticeable point of change is also observed in the offset (FIG. 7*b*) as well as enthalpy of crystallization, $\Delta H_C$, versus OSO content curves at the $0.4_{OSO}$ concentration (FIG. 7*c*). $\Delta H_C$ which is almost constant (233±8 J/g) for $0.0_{OSO}$ to $0.40_{OSO}$ mixtures decreased exponentially to level at ~68±11 J/g for the mixture with $X_{OSO}$ higher than 0.60.

In lieu of the faint singularity noticed in the crystallization characteristics, two very distinguishable eutectics separated by a singularity are observed in the liquidus line. The first eutectic concentration is located at $X_{E1}=0.50_{OSO}$ (Arrow E1 in FIG. 7*b*) and the second at $X_{E2}=0.80_{OSO}$ (Arrow E2 in FIG. 7*b*) and the singularity at ~$0.55_{OSO}$ (Arrow S in FIG. 7*b*). This type of phase boundary is indicative of the formation of a 1:1 (mol:mol) compound which forms a eutectic with both pure components. Similar types of phase boundaries are commonly observed in binary systems of lipids, such as PSP/PPS, SPS/PSS and PPP/PPS. They are attributed to the formation of a 1:1 molecular compound which forms two eutectics with both molecules in each side of the concentration range.

As will be explained in the coming section, the formation of such a compound is due to synergies between OSO and MeS, due to their particular structural configurations. The presence of the compound justifies the two eutectics and explains the solubility behavior of the OSO/MeS binary system as well as its thermal behavior at both the nucleation and growth stages.

A series of transformation lines are also drawn from the melting temperatures of the different endotherm displayed by the mixtures upon heating. Of particular interest, two eutectic lines associated with E1 and E2 (dashed lines in FIG. 7*b*) are determined.

Note that the reported position of the eutectic point as well as of the transformation lines depends on the thermal procedure used to identify phase transformation and development. The thermal protocol (cool and heat at constant rates) used to construct the phase diagrams of our binary system does not produce equilibrium states. However, they allow the study of solubility and may be extrapolated to describe equilibrium states. They are also interesting from an applied view point as the thermal protocol are closely similar to that/those used in industry.

Thermodynamic Analysis of the Boundaries in the Phase Diagram

The liquidus line of the binary system was simulated using the thermodynamic model described above. $T_p$ of the last endotherm (open circles in FIG. 8) was used, as typically done in the study of binary lipid mixtures. This point is much more suitable for studying equilibrium properties because it is determined by the most stable crystal.

As can be seen in FIG. 8, the compound (composition, $X_C$, molar heat of fusion, $\Delta H_C$, and melting point, $T_C$) form a eutectic with OSO (eutectic composition $X_{E1}$) and a eutectic with MeS (eutectic composition $X_{E2}$). The values of ($\Delta H_A$, $T_A$), ($\Delta H_B$, $T_B$) and ($\Delta H_C$, $T_C$) obtained from the DSC heating curves of the purified OSO (A), MeS (B) and compound (C), respectively, used to model the liquidus line in the phase diagram are listed in Table 4. The non-ideality of mixing parameter, ρ, was adjusted first manually in small steps to obtain a liquidus line which lies closest to the experimental boundaries. This line was then refined to calculate the curve that has the least sum of squares of the difference between experimental and calculated temperatures over the whole experimental compositions.

The experimental liquidus line has been very satisfactorily reproduced by simply considering the two eutectics separated by the singularity at $0.59_{OSO}$ and using Eq. (8) and (9) for each eutectic and a non-ideality of mixing parameter ρ for each branch. The simulated four segments of the liquidus line (labeled Ito IV) are represented by solid lines in FIG. 8. The simulation yielded negative values of ρ for all segments. The singularity has been confirmed at $0.59_{OSO}$ and the eutectic points obtained by the intersection of the two segments were confirmed at $0.52_{OSO}$ and $0.85_{OSO}$. The calculated values of ρ, $X_E$ and $T_E$ are listed in Table 4.

TABLE 4

Values of ($\Delta H_A$, $T_A$), ($\Delta H_B$, $T_B$) and ($\Delta H_C$, $T_C$) obtained from the DSC heating curves of the purified OSO (A), MeS (B) and compound (C), respectively, used to model the liquidus line in the phase diagram, and values of the non-ideality of mixing parameter (ρ) for the segments considered. Calculated values of the concentration, $X_E$, and temperature, $T_E$, of the eutectic points and compound.

| | $T_E$ (° C.) | $T_A$ (K) | $\Delta H_A$ (kJ/mol) | ρ (kJ/mol) |
|---|---|---|---|---|
| I (0% OSO to $X_{E1}$) | 37.1 | 310.2 | 64.00 | −7.0 |
| II ($X_{E1}$ to Compound) | 21.9 | 295.0 | 76.14 | −49.5 |
| III (Compound to $X_{E2}$) | 21.9 | 295.0 | 76.14 | −7.5 |
| IV ($X_{E2}$ to 100% OSO) | 21.0 | 294.1 | 53.22 | −15.0 |

| | $X_E$ | $T_E$ (° C.) | $T_E$ (K) |
|---|---|---|---|
| $X_{E1}$ | 50.8 | 20.0 | 293.1 |
| $X_{E2}$ | 84.9 | 17.1 | 290.1 |
| Compound | 58.5 | 21.9 | 295.0 |

The experimental kinetic phase diagram of the OSO/MeS binary system was well described by the introduction of negative values of ρ for all the segments considered (Table 4). The uncertainty attached to the calculated ρ-value is less than 2.5 kJ/mol. Recall that the Bragg-Williams approximation attributes the origin of the non-ideality of mixing to the enthalpy term of the free energy of mixing and assumes the same entropy term as in the ideal mixing case. The non-ideality of the mixing parameter, ρ, is the energy difference between (A–B) pair and the average of (A–A) pair and (B–B) pair. For ideal mixing, ρ is zero. Positive ρ reflects a tendency of like molecules to cluster, which beyond some critical value, $\rho_c$, leads to a phase separation. A negative ρ reflects a tendency for order, i.e. the formation of AB pairs is energetically more favorable compared with AA or BB pair formation. The molecular interactions, as depicted by the negative ρ-values, are strong and tend to favor the formation of unlike pairs in the liquid state. These values are comparable to published values for binary lipid systems such as binary mixtures of diacylphosphatidyl-ethanolamines, fatty acids, propanediol, diacetates, and TAGs Little work has been reported on the molecular structures and kinetic properties of systems which form molecular compounds. The formation of a 1:1 molecular compound is also observed in systems of two TAGs which both contain an unsaturated fatty acid such as POP/OPO, SOS/OSO, POP/PPO and POP/OPO, and SOS/SSO and justified by conformational considerations. It is suggested that the shape of the molecules is such that a very dense packing becomes possible with equal amounts of both molecules, though the crystals of each of the pure components can accommodate only a small amount of the other component.

The formation of such a compound in OSO/MeS can be explained by specific molecular interactions through the acyl chain moieties similarly to what has been suggested in the case of SOS/SSO and SOS/OSO. It is possible that FAME and symmetrical saturated/diunsaturated TAGs display a synergistic compatibility and pack to form a molecular compound due to specific interactions (molecular interactions of acyl chain packing, head groups conformation, and methyl end stacking). It is hypothesized that like chains from OSO and MeS can arrange themselves together less problematically than in FAME and mixed-acid saturated/diunsaturated TAG mixtures, where there is will be a pronounced steric effect. More experimental and modeling work is needed to understand this behavior.

The DSC data are consistent with the crystal structures and layering arrangements evidenced by XRD. For instance, the three groups of mixtures with fundamentally different polymorphism XRD (FIG. 5) are also those delimited by the two eutectics. The formation of a loosely bound 1:1 compound in the $\beta_T$-form was probably initiated in the liquid phase where the mobility of MeS is still not obstructed. The XRD data indicated that the addition of OSO to MeS results in the formation of disordered and inhomogeneous phases; particularly for packing arrangements in the layer direction. Furthermore, it revealed that the electronic environment of MeS was profoundly altered in the presence of OSO. The disruptive effect of OSO on the packing of MeS was effective at both the nucleation and growth stages of the crystallization process.

OSO was shown to be a very effective crystallization depressant which significantly delays nucleation and alters the growth of MeS. The effect was so strong that it lowered the melting point of MeS by ~17° C. in the first eutectic concentration. The presence of eutectic reactions spanning relatively large ranges of the phase diagram strongly indicates that the addition of OSO also reduces crystal size. This effect will be further investigated in a separate study.

Conclusion

The study of the OSO/MeS binary system by DSC and XRD revealed a complex phase behavior in which OSO plays a central role. The kinetic phase diagram of the OSO/MeS mixtures involved marked transitions including recrystallizations mediated by melt. OSO was shown to strongly affect the phase trajectories of MeS and to noticeably alter its polymorphism starting at low concentration. The liquidus line in the phase diagram demonstrated two eutectics, separated by a 1:1 (mol:mol) compound. The polymorphism uncovered by XRD demonstrated the coexistence of monoclinic, triclinic and orthorhombic forms distributed in concentration regions which matched those delimited by the two eutectics. The 50% concentration was confirmed as a loosely bound compound in the triclinic symmetry. A mechanism for disruption of crystallization was proposed to be dependent on the peculiar geometry of SOS: the "straight" stearic acid chain participates easily in the lamellar packing of the equally "straight" FAME, while its two kinked unsaturated oleic acid chains effectively halts additional saturated FAMES from participating in the packing due to steric hindrances.

The disruptive effect of the TAG on the packing of the saturated FAME was shown to effectively begin at low concentration and results in significant suppression of FAME crystallization. The rate at which melting point decreased from MeP to the eutectic was estimated at approximately 0.33K/% OSO. This relatively steep drop implies that judicious loadings of OSO which would target the saturated FAMEs will have the same large beneficial effects on the low temperature behavior of biodiesel. Certainly, much smaller concentrations than the eutectic of the OSO/MeS binary system will depress similarly the crystallization temperature of an actual biodiesel.

Studies of OPO and/or MeS

Particularly structured triacylglycerols (TAGs) can be used as additives for effective improvement of the flow performance of biodiesel. Doubly unsaturated 1, 3-dioleoyl-2-palmitoyl glycerol (OPO) is a TAG that has been found to reduce significantly the onset temperature of crystallization of biodiesel. In order to better understand the interactions between the additive and the saturated FAMEs responsible for the high melting temperature of biodiesel, a model binary system made of methyl stearate (MeS) and OPO was investigated using DSC. The MeS-OPO binary system demonstrated a complex phase behavior both on heating and cooling. A eutectic at $0.90_{OPO}$ and a peritectic transformation running within a large concentration region ($0.11_{OPO}$ to $0.65_{OPO}$) were evidenced in both the cooling and heating experiments, indicating that it is a common transformation for the stable as well as metastable crystals. The formation of an incongruent compound was also suggested. Thermodynamic modeling indicated a relatively complex intersolubility of MeS and OPO in the liquid phase, attributed to the presence of the peritectic compound. The model indicated a close to ideal mixing behavior for the mixtures in the range where the peritectic reaction occurred and a strong tendency for order in the eutectic region. It was established that OPO introduces disruptions at both the nucleation and growth stages which effectively delay the crystallization process.

Materials and Methods of Preparation of OPO and/or MeS

Sample Preparation

OPO was synthesized and purified in our laboratories and the MeS was purchased (Aldrich Chemical Co. Inc. in Oakville, Ontario). Their purities were greater than 99% as determined by high performance liquid chromatography (HPLC). The purified OPO and MeS were mixed in the desired molar fractions ($X_{OSO}$, molar fraction being X=0, 0.11, 0.25, 0.40, 0.50, 0.55, 0.60, 0.65, 0.70, 0.75, 0.85, 0.95 and 1.00), then heated at 80° C. and stirred for 5 min to ensure complete homogeneity. Special care was taken for the overall handling and storage (4° C.) of the samples.

Differential Scanning Calorimetry (DSC)

The solid-liquid phase behavior of the OPO/MeS mixtures was investigated by means of differential scanning calorimetry under cooling as well as heating protocols. The DSC measurements were carried out under a nitrogen flow of 50 mL/min on a Q200 model (TA Instruments, New Castle, Del.). Sample of approximately 0.4 to 0.6 (±0.1) mg in a hermetically sealed aluminum DSC pan was first equilibrated at 80° C. for 5 min, a temperature and a time over which crystal memory was erased, and cooled with a constant rate (5 K/min) down to −40° C. The sample was subsequently held at −40° C. for 5 min then reheated to 80° C. at a constant rate of 2.0 K/min to obtain the melting profiles. All measurement temperatures are reported to a certainty of better than ±0.5° C. The "TA Universal Analysis" software was used to analyze the data and extract the main characteristics of the peaks (peak temperature, $T_p$; onset temperature, $T_{On}$; offset temperature, $T_{Off}$; enthalpy, ΔH; and full width at half maximum, FWHM). The temperature window over which a thermal event occurs is defined as the absolute value of the difference between $T_{Off}$ and $T_{On}$ of that event. Subscripts C and M are used for crystallization and melting, respectively. The positions of non-resolved thermal events were estimated using the first and second derivatives of the differential heat flow and their other characteristics were simply estimated using the software elements. The reported values and uncertainties are the average and standard deviation values of at least three runs, respectively.

Thermodynamic Analysis of Boundaries in Phase Diagrams

The pseudo-equilibrium phase diagram was constructed using the data generated in the DSC heating experiments. The liquidus line was generated by the offset temperature of melting. This point is suitable for studying equilibrium properties because it is determined by the most stable crystal. The phase boundaries in the phase diagram was simulated using a simple thermodynamic model based on the Hildebrand equation coupled with the Bragg-William approximation for non-ideality of mixing. This model is a powerful tool commonly used to investigate the miscibility of the components in the study of lipid mixtures.

The Bragg-Williams approximation attributes the origin of the non-ideality of mixing to the enthalpy term of the free energy of mixing and assumes the same entropy term as in the ideal mixing case. The deviation from an ideal behavior is described by a non-ideality of mixing parameter, ρ (J/mol), defined as the difference in the energy of mixed-pairs (A–B) and the average pair interaction energy between like pairs (A–A and B–B) formed in the mixture:

$$\rho = z\left(u_{AB} - \frac{u_{AA} + u_{BB}}{2}\right) \quad (11)$$

where z is the first coordination number, $u_{AB}$, $u_{AA}$ and $u_{BB}$ the interaction energies for AB, AA and BB pairs, respectively.

According to this approximation, the two branches of an equilibrium liquidus line are described by the following equations depending on whether the composition is smaller or larger than the eutectic composition $X_E$, (Lee, 1977b; Tenchov, 1985):

$$\ln X_A + \frac{\rho(1 - X_A)^2}{RT} = -\frac{\Delta H_A}{R}\left(\frac{1}{T} - \frac{1}{T_A}\right) \quad (12)$$

-continued $$\ln X_B + \frac{\rho(1 - X_B)^2}{RT} = -\frac{\Delta H_B}{R}\left(\frac{1}{T} - \frac{1}{T_B}\right) \quad (13)$$

where R is the gas constant. $X_A$ represents the mole fraction of A, $\Delta H_A$ and $T_A$ are the molar heat of fusion and the melting point of component A. $X_B$, $\Delta H_B$ and $T_B$ are those of component B.

For ideal mixing, the intermolecular interaction of like-pairs is equal to that of mixed-pairs and consequently ρ=0 and the Hildebrand equation is obtained. A negative ρ is obtained when the formation of AB pairs is energetically more favorable than AA or BB pairs and reflects a tendency for order. A positive p is obtained when mixed-pair formation is energetically less favorable and reflects a tendency of like molecules to cluster, which beyond some critical value leads to phase separation.

Results and Analysis

Kinetic Phase Properties-Crystallization Behavior

FIGS. **9*a*1 and 9*a*2 shows DSC cooling thermograms obtained by cooling the fully melted mixture from 80 to −40° C. at a rate of 5 K/min to obtain metastable polymorphs. FIG. 9*b* displays the crystallization temperatures of the MeS/OPO mixtures obtained by the rapid cooling shown in FIGS. 9*a*1 and 9*a*2**. As can be seen, MeS crystallized with a sharp exotherm and OPO transformed via a two-step crystallization process. The DSC cooling trace obtained here for OPO is very similar to that obtained by using a more rapid cooling (15° C.). The resulting crystals from such a thermal protocol are not the most stable and the phase diagram drawn from the DSC cooling data would not therefore represent the equilibrium state for the system. One can however see from the peak temperatures of the main exotherms of MeS and OPO ($P_{MeS}$ at 31.0 and $P_{OPO}$ at −23.3° C.) that upon cooling, that the pure compounds crystallized in their respective β'-forms. Note that the β'-phase (orthorhombic) have been detected by XRD at −40° C. when OPO was processed similarly to the DSC protocol (not presented here).

The prolonged leading exotherm observed in the thermogram of pure OPO (S in FIGS. **9*a*1 and 9*a*2**) suggests that the nucleation and growth processes of the pure OPO phase was probably dominated by relatively continuous nuclei formation which extended over a relatively large window of temperature (~10° C.). The height of S remained small but almost constant as the temperature was decreased suggesting the formation of small and probably disordered lamellar structures from the melt. It is important to note that the enthalpy of S is less than 10% of the total enthalpy of crystallization, indicating that before the main crystallization event, most of the material remains liquid. The narrow and intense main exotherm following S indicate that the final OPO crystals formed rapidly from these entities or from new nuclei. Noticeably, the pure OPO experienced complex conformational adjustments along the transformation path during cooling in order to fully crystallize.

As OPO is added, the peak temperature $T_p$ of MeS shifted to lower temperatures and its intensity decreased noticeably ($P_1$ in FIGS. **9*a*1 and 9*a*2**). This peak could not be discriminated from the leading shoulder observed in the thermograms of the mixtures with concentrations ≥$0.65_{OPO}$. This suggests that while $P_1$ can be safely assigned to the crystallization of a phase made predominantly, if not exclusively, of MeS, MeS is taking part in the formation of the early lamellae from which an OPO-MeS mixed phase is growing in an OPO-like form.

The liquidus line constructed using the onset of crystallization upon cooling (▼ in FIG. **9*b*) as well as the leading peak (○ in FIG. 9***b*) exhibits two monotectic phases, distinguishable by a singularity at $0.65_{OPO}$ and suggests that the compounds MeS and OPO in the β' form are not miscible in the solid state. The two extra exotherms observed in the DSC thermograms of the mixtures (P2 and P3 in FIGS. 9*a*1 and 9*a*2) appeared as soon as OPO was added to MeS and delimit the boundaries of two clear transitions in the system (▲ and ♦ in FIG. 9*b*). The singularity in the cooling kinetic phase diagram is confirmed by the two transition lines at ~3.8° C. and −2.5° C. which extend from $0.10_{OPO}$ to $0.65_{OPO}$. The first line just below the liquidus line can be assigned to the $L+MeS_{\beta'}\flat MeS_{\beta'}+OPO_{\beta'}$ transformation (L=liquid).

The analysis of the enthalpy change associated with the individual phase transformations shown in FIG. 9*c* supports and further explains the phase diagram. The enthalpies of the peaks associated with the two transitions (P2 and P3) plotted as function of the composition of the mixture show "Tamman-like" plots which suggests that particular transformation points such as eutectics or peritectics may be present. Tamman plots can also be used to delimit the biphasic regions of a phase diagram (Chemik, 1995). The top of the "Tamman triangles" may be used to identify these points and the range of concentrations associated with them. This will be further discussed in light of the DSC heating data. The enthalpy of P2 increased linearly to reach a maxim at the $0.60_{OPO}$ then decreased linearly (▲ in FIG. 9*c*). The enthalpy of the third peak, P3, (♦ in FIG. 9*c*) increased only slightly up to the $0.50_{OPO}$ mixture, and then increased sharply to display a maximum at $0.85_{OPO}$. P3 is probably associated with a very inhomogeneous and disorganized small phase made exclusively of OPO. The rapid decrease of P1 with increasing MeS content concomitant with the linear increase of the enthalpy associated with P2, strongly suggest the formation of a MeS-OPO mixed phase at the detriment of a MeS phase. The complex trends observed in the enthalpy of the individual transition peaks (FIG. 10*c*) highlight the diversity of phase developments occurring in the OPO/MeS binary mixtures. The DSC data not exclude the formation of a molecular compound. One can however, outline two concentration regions, delimited at ~$0.50_{OPO}$ to $0.65_{OPO}$, in which MeS-OPO binary system has different phase behavior. Furthermore, singularities are also observed in the span of crystallization versus OPO molar ratio at $0.65_{OPO}$ and $0.90_{OPO}$ (FIG. 9*d*), highlighting additional important boundaries in the phase diagram. The singularities observed in the cooling data will be further discussed in light of the heating cycles, where much more defined transformation paths can be inferred.

Melting Behavior and Phase Development

The DSC traces of the OPO/MeS mixtures obtained upon heating are shown in FIGS. 10*a*1, 10*a*2, and 10*a*3. FIG. 10*b* shows the transition temperatures obtained at the peak maximum of the thermal events displayed in FIGS. 10*a*1, 10*a*2, and 10*a*3. It represents, in fact, the phase diagram of the OPO/MeP binary system. $T_{Off}$ (▼ in FIG. 10*b*) was used to determine the liquidus line, as typically done in the study of binary lipid mixtures. $T_M$ of the other peaks is used to represent the solid-solid transition lines after correction for the transition widths of the pure components.

The enthalpies of the individual endotherms are represented in FIG. 10*c* and are used to follow the relative content of the different phases involved in the transformations. Table 5 summarizes the structural and thermal data of four forms of OPO; α, β', $\beta_2$, and $\beta_1$ which are going to be used to discuss the phase diagram.

TABLE 5

Structural and thermal data of four forms of OPO; α, β', $\beta_2$, and $\beta_1$.

| Polymorph | α | β' | $\beta_2$ | $\beta_1$ |
|---|---|---|---|---|
| $T_m$ (° C.) | −18.3 | 11.7 | 15.8 | 21.9 |

The phase development of the OPO-rich mixtures is reminiscent of that of pure OPO. The transformation path of the mixtures seems to be mainly driven by recrystallizations from the melt starting from the least stable initial form of OPO formed on cooling. The multiple "recrystallizations" span over a very large temperature range (~37.0° C.). The transformation path of pure OPO and OPO-rich mixtures (up to $0.80_{OPO}$) is a succession of at least two direct recrystallizations, i.e., solid-solid transformations, from the pre-existing phase(s) which formed upon cooling into more stable phases followed by their subsequent melt as evidenced by the following well-resolved endotherms. The high temperature endotherm ($T_p$=19.78±0.15° C.) observed in the thermogram of OPO is the recording of the melting of $\beta_1$, probably the most stable phase of OPO (see Table 5). This endotherm remains strong and sharp (FWHM ~2.3° C.) even with 10% of MeS, indicating that the very well-organized OPO crystal phase is not significantly affected and seems to be relatively resilient to the influence of MeS at these levels. During the heating process (FIG. 10*a*1, 10*a*2, 10*a*3), the β'-form crystallizes from the least stable α and is transformed into the $\beta_1$-form, the most stable form, which finally, melts (exothermic transitions followed by an endotherm). Note that no exotherms were recorded for the mixtures with molar percentages less than 85% OPO. The heat flow recorded for the exothermic transformations did not weaken significantly with the addition of MeS, suggesting that it is the OPO phase that was still developing.

MeS melted with a single endotherm (P1 in FIG. 10*a*1, $T_{p1}$~38.07±0.12° C.) attributable to the melting of its β'-crystal phase. Note that this peak may be recording of successive melting of two very close β'-crystal phases formed upon the non-isothermal cooling as previously reported for this compound. The effect of OPO on the transformation path of MeS is noticeable even at small concentration. The addition of even small amounts of OPO to MeS induced a noticeable broadening of the melting window and subsequently an increase of the number of transitions available for the system. P1 decreased noticeably and disappeared for mixtures with $X_{OPO}$>0.50 (FIG. 10*c*), suggesting it associated with an MeS-rich phase in the #'-form.

The increase in OPO concentration caused a sharp decrease of offset of melting and of $T_p$ of the last endotherm. A very distinct eutectic was formed at the $0.90_{OPO}$ composition and a singularity can be noticed in the liquid-solid boundary at the $0.65_{OPO}$ composition (Arrows in FIG. 10*b*). The singularity in the liquidus line separates two monotectic regions ($X_{OPO}$=[0, 0.65] and [0.65, 0.90]) and is indicative of a probable peritectic point. Clearly, specific intermolecular interactions between OPO and MeP are at play and have a profound impact on phase development and intersolubility of the OPO/MeS binary system.

The peritectic transformation is well defined by a line located at ~21.91° C. spanning from $0.11_{OPO}$ to the apparent peritectic point (squares in FIG. 10*b*). The endothermic peak related to this transformation (P2 in FIGS. 10*a*1, 10*a*2, 10*a*3) appeared as soon as OPO was added to MeS and disappeared for $X_{OPO}$=0.90. The enthalpy of P2 displayed a typical "Tamman-type triangle" with a peak the $0.50_{OPO}$ mixture (■ in FIG. 10$c$). The peculiar behavior of the phase content associated with this peak points to the formation of a compound in the solid phase from the reaction of a liquid and a crystal. The values of melting temperature associated with the different forms of OPO (Table 5) strongly suggest that the compound so formed is in the β-form. Note that this peak started to shift to lower temperatures after the apparent peritectic point, indicating a loss in stability but because it disappeared at the eutectic point, its overall symmetry was not lost. The sharp decrease observed in its enthalpy is a sign that the compound is replaced gradually by the β-OPO pure phase.

A eutectic line at ~16.16±0.19° C. spanning from $0.60_{OPO}$ to $0.90_{OPO}$ can be clearly distinguished (P3 in FIGS. 10$a$1, 10$a$2, and 10$a$3 and ▲ FIG. 10$b$). The endothermic peak of the eutectic line is associated with the $\beta_1$-form of OPO (Table 5). This peak showed alongside a transition at 14° C. (P4 in FIG. 10$a$ and □ in FIG. 10$b$) which is probably the manifestation of a similar $\beta_1$-form with a slightly lower stability. Note that the combined enthalpy of these two peaks increased linearly from a value of 6 ±2 J/g when it first appeared at $0.50_{OPO}$ to its maximum at $0.85_{OPO}$ (▲ in FIG. 10$c$) indicating the eutectic nature of the transformation and delimiting its boundaries. Note that a low temperature sloped solid-solid transformation is also detected in the DSC heating phase diagram. The transition temperatures obtained for this line in the OPO-rich mixtures are ~10° C., which correspond to the melting of the β'-form of OPO (Table 5). The slope of this line is due to kinetic effects.

Thermodynamic Analysis of the Liquidus Line

A thermodynamic model based on the Hildebrand equation coupled with the Bragg-William approximation for non-ideality of mixing was used to simulate the liquidus line in the phase diagram (FIG. 11). The parameters $T_A$, $T_B$, $\Delta H_A$ and $\Delta H_B$ used to simulate the liquidus line are summarized in Table 6. The standard method of least squares approach was used to obtain the best fit liquidus line and subsequent value of ρ.

The calculated liquidus line assuming an ideal mixture (ρ=0 in Eq. (12) and (13)) did not reproduce the experimental liquidus line and is not shown. The experimental liquidus line has been satisfactorily reproduced by considering the eutectic and a peritectic branch separated by the peritectic singularity at $0.65_{OPO}$. The simulated three segments of the liquidus line (labeled I to III) are represented by solid lines in FIG. 11. The singularity has been confirmed at $0.62_{OPO}$ and the eutectic point obtained by the intersection of the two eutectic segments was confirmed at $0.92_{OPO}$. The calculated ρ-values are listed in Table 6. Obtained ρ-values are comparable to published values for binary lipid systems.

TABLE 6

Parameters (Enthalpy of melting, $\Delta H_A$, and melting temperature, $T_A$) of the Bragg - William approximation (Eq. 12) used to simulate the different segments of the liquidus line and corresponding values of the non-ideality of mixing parameter, ρ.

| Segment | Region | $T_A$ (K) | $\Delta H_A$ (kJ/mol) | ρ (kJ/mol) | Chi² |
|---|---|---|---|---|---|
| I | $0 \le X_A \le 0.65$ | 311.13 ± 0.13 | 72.89 | −3.5 | 1.1295 |
| II | $0.65 \le X_A \le 0.90$ | 295.18 ± 0.12 | 195.69 | −29.8 | 0.1930 |
| III | $0.90 \le X_A \le 1.0$ | 292.80 ± 0.15 | 122.33 | −97.1 | 0.1857 |

The simulation yielded negative values of ρ for all segments (Table 5). The value of ρ obtained for the peritectic region (region I) is a rather small value close to zero indicating a mixing behavior very close to ideal. On the eutectic region, and for both branches (Region II and III in FIG. 11) the fit yielded large negative ρ-values reflecting a strong tendency for order. It is a clear indication that strong OPO-MeS molecular interactions which tend to favor the formation of mixed pairs in the liquid state are at play. Note, however, that the absolute value of ρ obtained for Region III is 3 times greater than that for Region II, indicating that the tendency of unlike pairing is much more pronounced for mixtures richer in OPO. The formation of a peritectic compound with an incongruent melting maybe the reason for such a lower ρ. This result is a clear indication that the disturbance of the MeS/OPO's crystal packing is significant even at low concentration of on both sides of the phase diagrams.

Conclusion

The MeS-OPO binary system has demonstrated a complex phase behavior both on heating and cooling. A clear eutectic was shown for the most stable crystals at the $0.90_{OPO}$ point with a eutectic line at 16° C. spanning from $0.60_{OPO}$ to the eutectic point. A peritectic transformation running within a large concentration region ($0.11_{OPO}$ to $0.65_{OPO}$) was evidenced in both the cooling and heating experiments, indicating that it is a common transformation for the stable as well as metastable crystals. Tamman plots of the enthalpy of the individual transformations support the presence of the peritectic and eutectic transitions and suggest the formation of an incongruent compound. The application of the simple Bragg-William thermodynamic model yielded excellent fits of the different branches of the pseudo-equilibrium liquidus line. Furthermore, it indicated a relatively complex intersolubility of MeS and OPO in the liquid phase, due probably to the presence of the peritectic compound. The values of the non-ideal of mixing parameter indicated a close to an ideal mixing behavior for the mixtures in the range where the peritectic reaction occurred (up to $0.65_{OPO}$) and a strong tendency for order in the eutectic region. However, the pairing of the unlike molecules 'MeS-OPO' in the OPO-rich eutectic branch was much more favored than OPO with the peritectic compound in the $X_{OPO}$=0.65 to 0.90 concentration range. It is clear that OPO introduces disruptions at both the nucleation and growth stage that effectively delay the crystallization process. The binary phase diagram of the methyl stearate-OPO binary system can be directly implicated in the thermal behavior of biodiesel because MeS (and MeP) are responsible for crystal formation at low temperatures and instrumental in defining cloud point (CP), pour point (PP), and cold filter plugging point (CFPP). There was no experimental evidence of any metatectic transformation. This is of significant interest as the presence of a metatectic reaction is responsible for the formation of a higher quantity of large solids below the cloud point than a simple eutectic or peritectic system.

The foregoing detailed description and accompanying figures have been provided by way of explanation and illustration, and are not intended to limit the scope of the invention. Many variations in the present embodiments illustrated herein will be apparent to one of ordinary skill in the art, and remain within the scope of the invention and their equivalents.

We claim:

1. A biodiesel crystallization depressant composition comprising a triacylglycerol comprising 1,3-dioleoyl-2-palmitoyl glycerol wherein the 1,3-dioleoyl-2-palmitoyl glycerol is mixed with a biodiesel fuel comprising methyl palmitate or methyl stearate.

2. The composition of claim 1, wherein the 1,3-dioleoyl-2-palmitoyl glycerol and the methyl palmitate are mixed to a desired molar fraction, $X_{OPO}$, where X ranges from 0.05 to 1.0.

3. The composition of claim 2, wherein the mixture of the 1,3-dioleoyl-2-palmitoyl glycerol and the methyl palmitate comprises two DSC cooling and/or heating cycle eutectics at molar fraction $0.45_{OPO}$ and $0.80_{OPO}$.

4. The composition of claim 3, wherein the mixture of the 1,3-dioleoyl-2-palmitoyl glycerol and the methyl palmitate has a calculated liquidus line comprising (i) a non-ideality of mixing parameter of between about −62.54 kJ/mol to about 0.68 kJ/mol, (ii) an enthalpy of melting of between about 24 kJ/mol to about 161 kJ/mol, and (iii) a melting temperature of between about 293 K to about 303 K.

5. The composition of claim 1, wherein the 1,3-dioleoyl-2-palmitoyl glycerol and the methyl stearate are mixed to a desired molar fraction, $X_{OPO}$, where X ranges from 0.11 to 1.0.

6. The composition of claim 5, wherein the mixture of the 1,3-dioleoyl-2-palmitoyl glycerol and the methyl stearate comprises a singularity at $0.65_{OPO}$ and $0.90_{OPO}$.

7. The composition of claim 5, wherein the mixture of the 1,3-dioleoyl-2-palmitoyl glycerol and the methyl stearate comprises a DSC heating cycle eutectic at molar fraction $0.90_{OPO}$.

8. The composition of claim 5, wherein the mixture of the 1,3-dioleoyl-2-palmitoyl glycerol and the methyl stearate comprises a DSC heating cycle peritectic at molar fraction $0.65_{OPO}$, with a DSC heating cycle peritectic line spanning from molar fraction $0.11_{OPO}$ to molar fraction $0.65_{OPO}$.

9. The composition of claim 1, wherein the mixture of the 1,3-dioleoyl-2-palmitoyl glycerol and the methyl stearate has a calculated liquidus line comprising (i) a non-ideality of mixing parameter of between about −97.1 kJ/mol to about −3.5 kJ/mol, (ii) an enthalpy of melting of between about 72.89 kJ/mol to about 195.69 kJ/mol, and (iii) a melting temperature of between about 19° C. to about 38° C.

10. A biodiesel crystallization depressant composition comprising a triacylglycerol comprising 2-stearoyl diolein wherein the 2-stearoyl diolein is mixed with a biodiesel fuel comprising methyl stearate.

11. The composition of claim 10, wherein the 2-stearoyl diolein and the methyl stearate are mixed to a desired molar fraction, $X_{OSO}$, where X ranges from 0.05 to 1.0.

12. The composition of claim 11, wherein the mixture of the 2-stearoyl diolein and the methyl stearate comprises a molar fraction of $0.65_{OSO}$ to $1.0_{OSO}$, and wherein the mixture comprises a crystallization primarily in an orthorhombic form.

13. The composition of claim 11, wherein the mixture of the 2-stearoyl diolein and the methyl stearate comprises a molar fraction of $0.05_{OSO}$ to $0.65_{OSO}$, and wherein the mixture comprises a crystallization primarily in a triclinic form and a monoclinic form.

14. The composition of claim 11, wherein the mixture of the 2-stearoyl diolein and the methyl stearate has two DSC heating cycle eutectics at molar fraction $0.50_{OSO}$ and $0.80_{OSO}$.

15. A biodiesel crystallization depressant composition comprising a triacylglycerol comprising 1,3-dioleoyl-2-palmitoyl glycerol wherein (a) the 1,3-dioleoyl-2-palmitoyl glycerol is mixed with a biodiesel fuel comprising methyl palmitate or methyl stearate; (b) the 1,3-dioleoyl-2-palmitoyl glycerol and the methyl palmitate are mixed to a desired molar fraction, $X_{OPO}$, where X ranges from 0.05 to 1.0; (c) the mixture of the 1,3-dioleoyl-2-palmitoyl glycerol and the methyl palmitate comprises two DSC cooling and/or heating cycle eutectics at molar fraction $0.45_{OPO}$ and $0.80_{OPO}$; (d) the mixture of the 1,3-dioleoyl-2-palmitoyl glycerol and the methyl palmitate has a calculated liquidus line comprising (i) a non-ideality of mixing parameter of between about −62.54 kJ/mol to about 0.68 kJ/mol, (ii) an enthalpy of melting of between about 24 kJ/mol to about 161 kJ/mol, and (iii) a melting temperature of between about 293 K to about 303 K; (e) the 1,3-dioleoyl-2-palmitoyl glycerol and the methyl stearate are mixed to a desired molar fraction, $X_{OPO}$, where X ranges from 0.11 to 1.0; (f) wherein the mixture of the 1,3-dioleoyl-2-palmitoyl glycerol and the methyl stearate comprises a singularity at $0.65_{OPO}$ and $0.90_{OPO}$, (g) the mixture of the 1,3-dioleoyl-2-palmitoyl glycerol and the methyl stearate comprises a DSC heating cycle eutectic at molar fraction $0.90_{OPO}$; (h) the mixture of the 1,3-dioleoyl-2-palmitoyl glycerol and the methyl stearate comprises a DSC heating cycle peritectic at molar fraction $0.65_{OPO}$, with a DSC heating cycle peritectic line spanning from molar fraction $0.11_{OPO}$ to molar fraction $0.65_{OPO}$; and (i) the mixture of the 1,3-dioleoyl-2-palmitoyl glycerol and the methyl stearate has a calculated liquidus line comprising (i) a non-ideality of mixing parameter of between about −97.1 kJ/mol to about −3.5 kJ/mol, (ii) an enthalpy of melting of between about 72.89 kJ/mol to about 195.69 kJ/mol, and (iii) a melting temperature of between about 19° C. to about 38° C.

16. A biodiesel crystallization depressant composition comprising a triacylglycerol comprising 2-stearoyl diolein wherein (a) the 2-stearoyl diolein is mixed with a biodiesel fuel comprising methyl stearate; (b) the 2-stearoyl diolein and the methyl stearate are mixed to a desired molar fraction, $X_{OSO}$, where X ranges from 0.05 to 1.0; (c) the mixture of the 2-stearoyl diolein and the methyl stearate comprises a molar fraction of $0.65_{OSO}$ to $1.0_{OSO}$, and wherein the mixture comprises a crystallization primarily in an orthorhombic form; (d) the mixture of the 2-stearoyl diolein and the methyl stearate comprises a molar fraction of $0.05_{OSO}$ to $0.65_{OSO}$, and wherein the mixture comprises a crystallization primarily in a triclinic form and a monoclinic form; (e) the mixture of the 2-stearoyl diolein and the methyl stearate has two DSC heating cycle eutectics at molar fraction $0.50_{OSO}$ and $0.80_{OSO}$.

* * * * *